US010033300B2

(12) United States Patent
Yamashita et al.

(10) Patent No.: US 10,033,300 B2
(45) Date of Patent: Jul. 24, 2018

(54) POWER CONVERSION DEVICE AND VEHICLE DRIVE SYSTEM

(71) Applicant: Mitsubishi Electric Corporation, Chiyoda-ku, Tokyo (JP)

(72) Inventors: Yoshinori Yamashita, Tokyo (JP); Sho Kato, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 0 days.

(21) Appl. No.: 15/507,059

(22) PCT Filed: Aug. 28, 2014

(86) PCT No.: PCT/JP2014/072660
§ 371 (c)(1),
(2) Date: Feb. 27, 2017

(87) PCT Pub. No.: WO2016/031031
PCT Pub. Date: Mar. 3, 2016

(65) Prior Publication Data
US 2017/0279371 A1 Sep. 28, 2017

(51) Int. Cl.
*H02M 7/48* (2007.01)
*H02M 7/5395* (2006.01)
*H02M 7/5387* (2007.01)

(52) U.S. Cl.
CPC ............ *H02M 7/48* (2013.01); *H02M 7/5395* (2013.01); *H02M 7/53875* (2013.01); *H02M 2007/4803* (2013.01)

(58) Field of Classification Search
CPC .. H02M 7/48; H02M 7/4807; H02M 7/53875; H02M 7/539; H02M 7/5395; H02M 2007/4803
See application file for complete search history.

(56) References Cited

U.S. PATENT DOCUMENTS

2010/0219780 A1* 9/2010 Morimoto ........... H02P 21/0089
318/400.02
2010/0250067 A1* 9/2010 Matsumura ............ B62D 5/046
701/41
(Continued)

FOREIGN PATENT DOCUMENTS

JP 10-234199 A 9/1998
JP 2001-238457 A 8/2001
(Continued)

OTHER PUBLICATIONS

International Search Report (PCT/ISA/210) dated Nov. 18, 2014, by the Japanese Patent Office as the International Searching Authority for International Application No. PCT/JP2014/072660.
(Continued)

*Primary Examiner* — Jeffrey Gblende
*Assistant Examiner* — David A. Singh
(74) *Attorney, Agent, or Firm* — Buchanan Ingersoll & Rooney PC

(57) ABSTRACT

To include a carrier-wave generation unit to generate a first carrier wave with a frequency higher than a modulation wave, and a second carrier wave with a frequency lower than the first carrier wave, a comparison unit to compare either the first carrier wave or the second carrier wave to the modulation wave in order to generate a switching signal. The carrier-wave generation unit outputs the second carrier wave when a modulation factor is lower than a threshold value, and outputs the first carrier wave when the modulation factor is equal to or higher than the threshold value. When the modulation factor is equal to or higher than the threshold value, a power conversion unit operates in an overmodulation mode, in which the switching operation is stopped during a period longer than one cycle of the second carrier wave.

16 Claims, 22 Drawing Sheets

(56) References Cited

U.S. PATENT DOCUMENTS

| | | | | |
|---|---|---|---|---|
| 2011/0115420 A1* | 5/2011 | Yamada | ................. | H02P 27/04 |
| | | | | 318/400.09 |
| 2011/0187308 A1* | 8/2011 | Suhama | ................. | H02P 27/04 |
| | | | | 318/798 |
| 2014/0232318 A1 | 8/2014 | Yokozutsumi et al. | | |
| 2015/0357988 A1 | 12/2015 | Yokozutsumi et al. | | |

FOREIGN PATENT DOCUMENTS

| | | |
|---|---|---|
| JP | 2010-114969 A | 5/2010 |
| WO | WO 2009/063786 A1 | 5/2009 |
| WO | WO 2012/081493 A1 | 6/2012 |
| WO | WO 2013/046462 A1 | 4/2013 |
| WO | WO 2014/122736 A1 | 8/2014 |

OTHER PUBLICATIONS

Written Opinion (PCT/ISA/237) dated Nov. 18, 2014, by the Japanese Patent Office as the International Searching Authority for International Application No. PCT/JP2014/072660.

H. Sugimoto, "Practical theory and design of AC servo system", Sogo Denshi Shuppansha, 1990, 23 pages (w/partial English translation of p. 39, line 29 through p. 44, line 17).

* cited by examiner

POWER CONVERSION DEVICE AND VEHICLE DRIVE SYSTEM

FIELD

The present invention relates to a power conversion device that executes a pulse width modulation (hereinafter, "PWM") control.

BACKGROUND

Conventionally, there has been a power conversion device that is commonly known as executing a PWM control by comparing a modulation wave that is synchronized with an AC output voltage to a carrier wave that is a triangular wave, a saw-tooth wave, or the like, and that has a frequency higher than the modulation wave. For example, Non Patent Literature 1 listed below has disclosed a common technique related to the PWM control. For another example, Patent Literature 1 listed below has disclosed a technique to perform the mode switching in order of "asynchronous bipolar modulation mode", "synchronous PWM mode", and "1-pulse mode" in the order when the modulation factor increases during the normal operation. The Patent Literature 1 has also disclosed a technique to perform the mode switching in order of "asynchronous bipolar modulation mode", "asynchronous overmodulation mode", and "1-pulse mode" when the modulation factor increases during reacceleration in the high-speed range (also referred to as "restart").

CITATION LIST

Patent Literature

Patent Literature 1: Japanese Patent Application Laid-open No. 2001-238457

Non Patent Literature

Non Patent Literature 1: Hidehiko Sugimoto, "Practical theory and design of AC servo system", Sogo Denshi Shuppansha, 1990

SUMMARY

Technical Problem

As described above, for example when the modulation factor increases at the time of restart in the high-speed range, the conventional power conversion device executes the control to switch the asynchronous bipolar modulation mode to the asynchronous overmodulation mode. However, upon executing the mode-switching control as described above, in the overmodulation mode, the power conversion device stops the switching operation during the period in which the value of the modulation wave is constantly greater than the value of the carrier wave. The number of voltage pulses included in one cycle of the carrier wave is decreased according to the switching stop. This may possibly cause ripples in a voltage to be applied to a load by the power conversion device (hereinafter, "AC output voltage", or simply "output voltage").

In order to suppress the ripples in the output voltage, it is considered to set a higher carrier-wave frequency in advance, taking into account the decrease in the number of pulses in the overmodulation mode. However, when a carrier-wave frequency is set to have a higher frequency, the number of voltage pulses is not decreased under a condition that a modulation factor before switching to the overmodulation mode is low, and thus there is a problem that the switching frequency increases than necessary, leading to an increasing in the switching loss.

The present invention has been achieved to solve the above problems, and an object of the present invention is to provide a power conversion device and a vehicle drive system that can suppress an unnecessary increase in switching loss at the time of switching over the modulation mode.

Solution to Problem

In order to solve the above problems and to achieve the object, according to an aspect of the present invention, there is provided a power conversion device including a modulation-wave generation unit to generate a modulation wave, a carrier-wave generation unit to generate a first carrier wave with a frequency higher than the modulation wave, and a second carrier wave with a frequency lower than the first carrier wave, a switching-signal generation unit to generate a switching signal by comparing the carrier wave to the modulation wave, and a power conversion unit to include a switching element that performs a switching operation based on the switching signal, wherein the carrier-wave generation unit outputs the second carrier wave when a modulation factor of the power conversion unit is lower than a threshold value, and outputs the first carrier wave when the modulation factor is equal to or higher than the threshold value, and wherein when the modulation factor is equal to or higher than the threshold value, the power conversion unit operates in an overmodulation mode, in which the switching operation is stopped during a period longer than one cycle of the second carrier wave.

Advantageous Effects of Invention

According to the present invention, there is obtained an effect where, in a power conversion device that performs a switching operation, it is possible to suppress an unnecessary increase in switching loss.

DESCRIPTION OF EMBODIMENTS

A power conversion device according to embodiments of the present invention will be described below with reference to the accompanying drawings. The present invention is not limited to the embodiments.

First Embodiment

Figure 1:
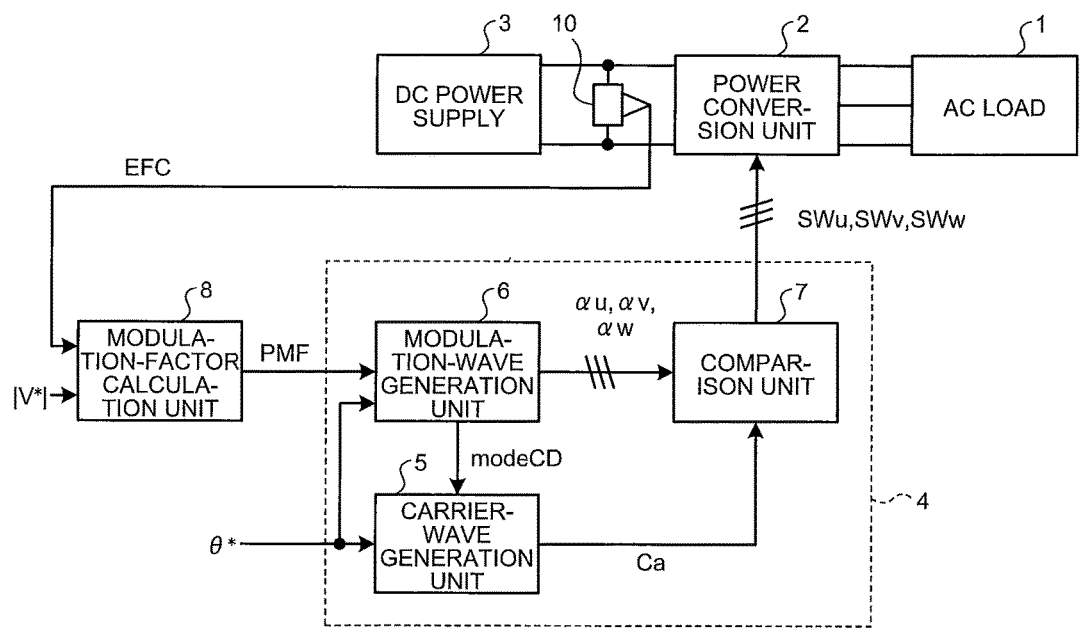
FIG. 1 is a diagram illustrating a configuration of a power conversion device according to a first embodiment.

FIG. 1 is a diagram illustrating a configuration of a power conversion device according to a first embodiment. As illustrated in FIG. 1, the power conversion device according to the first embodiment is configured to drive an AC load 1 that is, for example, an AC electric motor, and therefore includes a power conversion unit 2, a DC power supply 3, a switching-signal generation unit 4, a modulation-factor calculation unit 8, and a voltage detection unit 10. The switching-signal generation unit 4 is configured to include a carrier-wave generation unit 5, a modulation-wave generation unit 6, and a comparison unit 7. In FIG. 1, the switching-signal generation unit 4 is configured to incorporate therein the carrier-wave generation unit 5 and the modulation-wave generation unit 6. It is also possible that the carrier-wave generation unit 5 and the modulation-wave generation unit 6 are provided outside the switching-signal generation unit 4.

The power conversion unit 2 has a function of converting DC power supplied from the DC power supply 3 to variable-voltage variable-frequency AC power so as to supply the converted AC power to the AC load 1. For the purpose of modulation-factor calculation described later, the voltage detection unit 10 detects a DC voltage EFC output by the DC power supply 3 to the input side of the power conversion unit 2 (the DC power supply side: on the left side in FIG. 1), and outputs the detected DC voltage EFC to the modulation-factor calculation unit 8.

Figure 22:
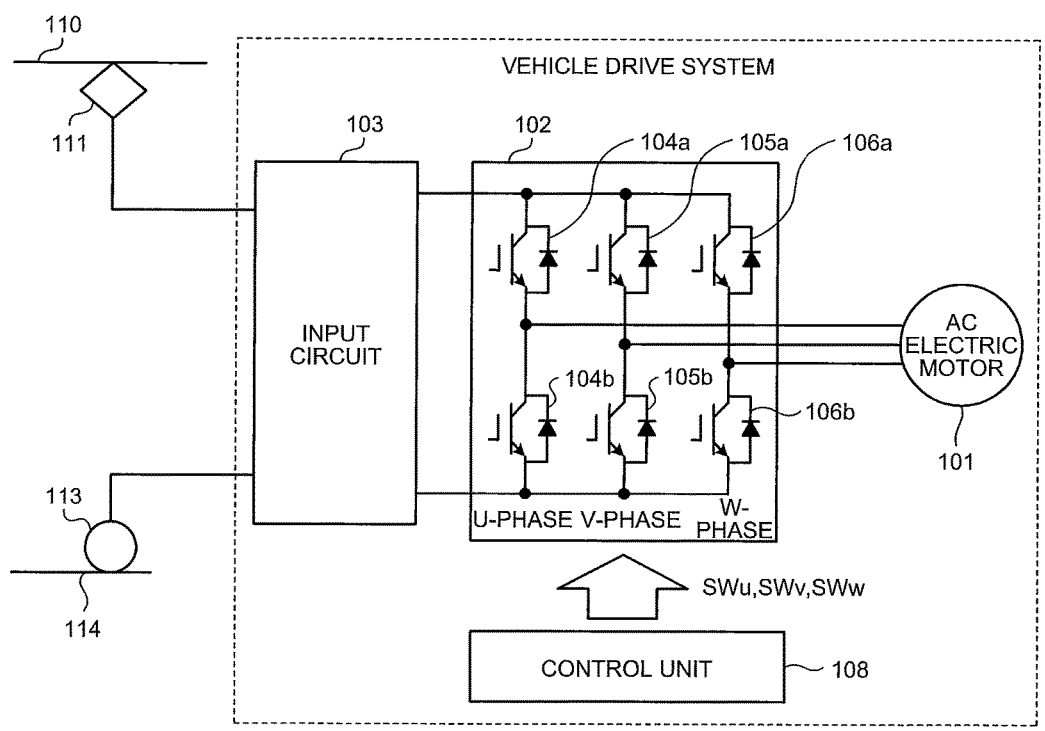
FIG. 22 is a diagram illustrating a configuration example of a vehicle drive system in which the power conversion device according to the first embodiment is applied to a railway vehicle.

The above power conversion operation in the power conversion unit 2 is performed by driving a plurality of semiconductor switch elements by switching signals SWu, SWv, and SWw generated by the switching-signal generation unit 4, the plurality of semiconductor switch elements constituting the power conversion unit 2. Refer to FIG. 22 described later as for the configuration of the power conversion unit 2.

The switching-signal generation unit 4 generates the switching signals SWu, SWv, and SWw that control the power conversion unit 2 based on an output-voltage phase-angle command θ* that is input externally, and based on a modulation factor PMF that is input through the modulation-factor calculation unit 8. Specifically, based on an output-voltage command |V*|, the modulation-wave generation unit 6 outputs modulation waves αu, αv, and αw that serve as AC-waveform signals whose fundamental waves correspond to one cycle of the output-voltage command |V*|. Based on a mode selection code modeCD generated by the modulation-wave generation unit 6, the carrier-wave generation unit 5 outputs as a signal a carrier wave whose fundamental wave is a sawtooth wave, a triangular wave, or the like, and whose frequency is higher than the modulation wave. The frequency of this carrier wave basically corresponds to a switching frequency for the power conversion unit 2, except for the case in the overmodulation mode. A modulation wave generated by the modulation-wave generation unit 6, and a carrier wave generated by the carrier-wave generation unit 5, are independent signals that are not synchronized with each other in an asynchronous mode. These modulation wave and carrier wave are generated as signals that are synchronized with each other in a synchronous mode. These carrier-wave signal and modulation-wave signal are input to the comparison unit 7. Based on the magnitude relation between values of these signals that vary from time to time, the switching signals SWu, SWv, and SWw are generated and output to the power conversion unit 2.

For example, in the case where the power conversion unit 2 is a two-level inverter, the following signals are generated as switching signals to be output to the power conversion unit 2 in accordance with the magnitude relation between the modulation wave and the carrier wave.

(a) Period having a relation of modulation wave>carrier wave

Signal to select the higher potential of DC-voltage input (b) Period having a relation of modulation wave<carrier wave Signal to select the lower potential of DC-voltage input In FIG. 1, the AC load 1 is illustrated as a three-phase load. The AC load 1 may be a polyphase AC load to which a polyphase alternating current is applied. In the case where the AC load 1 is a polyphase AC load, signals for the respective phases are generated as a modulation wave, and also the modulation wave and the carrier wave for the respective phases are compared to each other. A switching signal for the respective phases is thereby generated and output to the power conversion unit 2.

In the manner as described above, the switching signals generated by the switching-signal generation unit 4 are output to the power conversion unit 2 to perform PWM modulation. Also, DC power is converted to polyphase AC power to drive the AC load 1.

The control method described in the preceding paragraphs is a commonly-known technique, and is applied in common with the respective modulation modes. The more detailed information is described in, for example, Non Patent Literature 1, and therefore the further descriptions are omitted herein.

Next, the operation of the modulation-factor calculation unit 8 as well as the operation of the carrier-wave generation unit 5, the modulation-wave generation unit 6, and the comparison unit 7 which are incorporated in the switching-signal generation unit 4 are described.

First, the modulation-factor calculation unit 8 calculates the modulation factor PMF according to the following equation by using the DC voltage EFC and the output-voltage command |V*|. The DC voltage EFC is detected by the voltage detection unit 10, and the output-voltage command |V*| is a command value for the AC voltage to be applied to the AC load 1 by the power conversion unit 2 in order to drive the AC load 1.

$$|V^*| = \sqrt{(Vd^2 + Vq^2)} \quad (1)$$

$$PMF = (\pi/\sqrt{(6)})|V^*|/EFC \quad (2)$$

Figure 2:
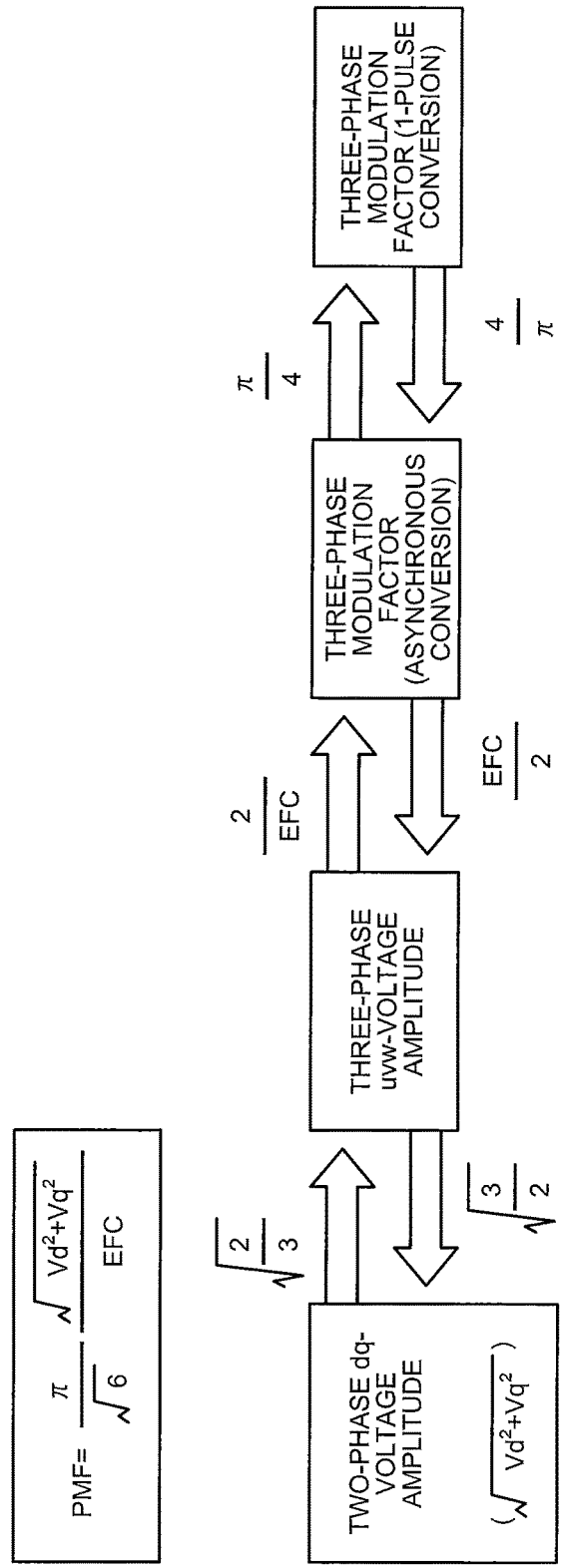
FIG. 2 is an explanatory diagram of a definition of a modulation factor PMF in the present specification.

The modulation factor PMF can be defined in various manners. The definition of the modulation factor PMF in the present specification is clarified below. FIG. 2 is an explanatory diagram of the definition of the modulation factor PMF in the present specification.

In the case where the power conversion unit 2 drives the AC load 1, a vector control is often executed, in which a current that flows in and out of the AC load 1 is separated into an excitation current (a d-axis current) and a torque current (a q-axis current), and these currents are individually controlled. At the time of executing this vector control, an excitation voltage (also referred to as "d-axis voltage") and a torque voltage (also referred to as "q-axis voltage") are generated within the switching-signal generation unit 4. Therefore, in this specification, as shown by the above equation (1), the output-voltage command |V*| is expressed as root-sum-square of the d-axis voltage Vd and the q-axis voltage Vq that are perpendicular to each other (hereinafter, appropriately represented as "two-phase dq-voltage amplitude").

In a case that the two-phase dq-voltage amplitude is converted to a voltage value of the three-phase UVW coordinate system (hereinafter, appropriately represented as "three-phase uvw-voltage amplitude"), this two-phase dq-voltage amplitude is multiplied by $\sqrt{(2/3)}$ that is a conversion coefficient of the coordinate conversion, as illustrated in FIG. 2. Thereafter, as illustrated in FIG. 2, in a case that the three-phase uvw-voltage amplitude is converted to a three-phase modulation factor of asynchronous conversion, this three-phase uvw-voltage amplitude is multiplied by (2/EFC) that is a conversion coefficient. In a case that the three-phase modulation factor of asynchronous conversion is converted to a three-phase modulation factor of 1-pulse (1P) conversion, this three-phase modulation factor of asynchronous conversion is multiplied by (π/4) that is a conversion coefficient. "1P conversion" means that the modulation factor PMF in the 1-pulse mode (180° energization), which is commonly known in this technical field, is defined as "1" (that is, the modulation factor in the 1-pulse mode is defined as 100% in the present specification).

Therefore, by multiplying the two-phase dq-voltage amplitude $\sqrt{(Vd^2+Vq^2)}$ by these coefficients sequentially, the definition equation of the modulation factor PMF is obtained as expressed as the following equation.

$$PMF = \sqrt{(Vd^2 + Vq^2)} \times \sqrt{(2/3)} \times (2/EFC) \times (\pi/4) \quad (3)$$

$$= (\pi/\sqrt{(6)}) \times \sqrt{(Vd^2 + Vq^2)}/EFC$$

When the three-phase modulation factor of 1P conversion is converted to the 2-phase dq-voltage amplitude, it is sufficient that the conversion processing from the right side toward the left side of the diagram in FIG. 2 is performed in accordance with the inverse of the conversion coefficients, that is, the conversion coefficients illustrated on the lower side of the diagram in FIG. 2.

Referring back to FIG. 1, information of the modulation factor PMF calculated by the modulation-factor calculation unit 8 is input to the modulation-wave generation unit 6. The modulation-wave generation unit 6 generates U-phase, V-phase, and W-phase modulation waves αu, αv, and αw based on the output-voltage phase-angle command θ* and the modulation factor PMF calculated by the modulation-factor calculation unit 8. The internal configuration and detailed operation of the modulation-wave generation unit 6 are described later.

The carrier-wave generation unit 5 generates a carrier wave Ca that is common to the U-phase, V-phase, and W-phase based on the mode selection code modeCD described later, and based on the output-voltage phase-angle command θ*. The comparison unit 7 compares each of the modulation waves αu, αv, and αw, generated by the modulation-wave generation unit 6, to the carrier wave Ca generated by the carrier-wave generation unit 5, and based on the comparison results, generates the switching signals SWu, SWv, and SWw that are control signals to the power conversion unit 2. The power conversion unit 2 is controlled by the switching signals SWu, SWv, and SWw, and applies an output voltage to the AC load 1 based on the output-voltage command |V*| in order to drive the AC load 1.

Figure 3:
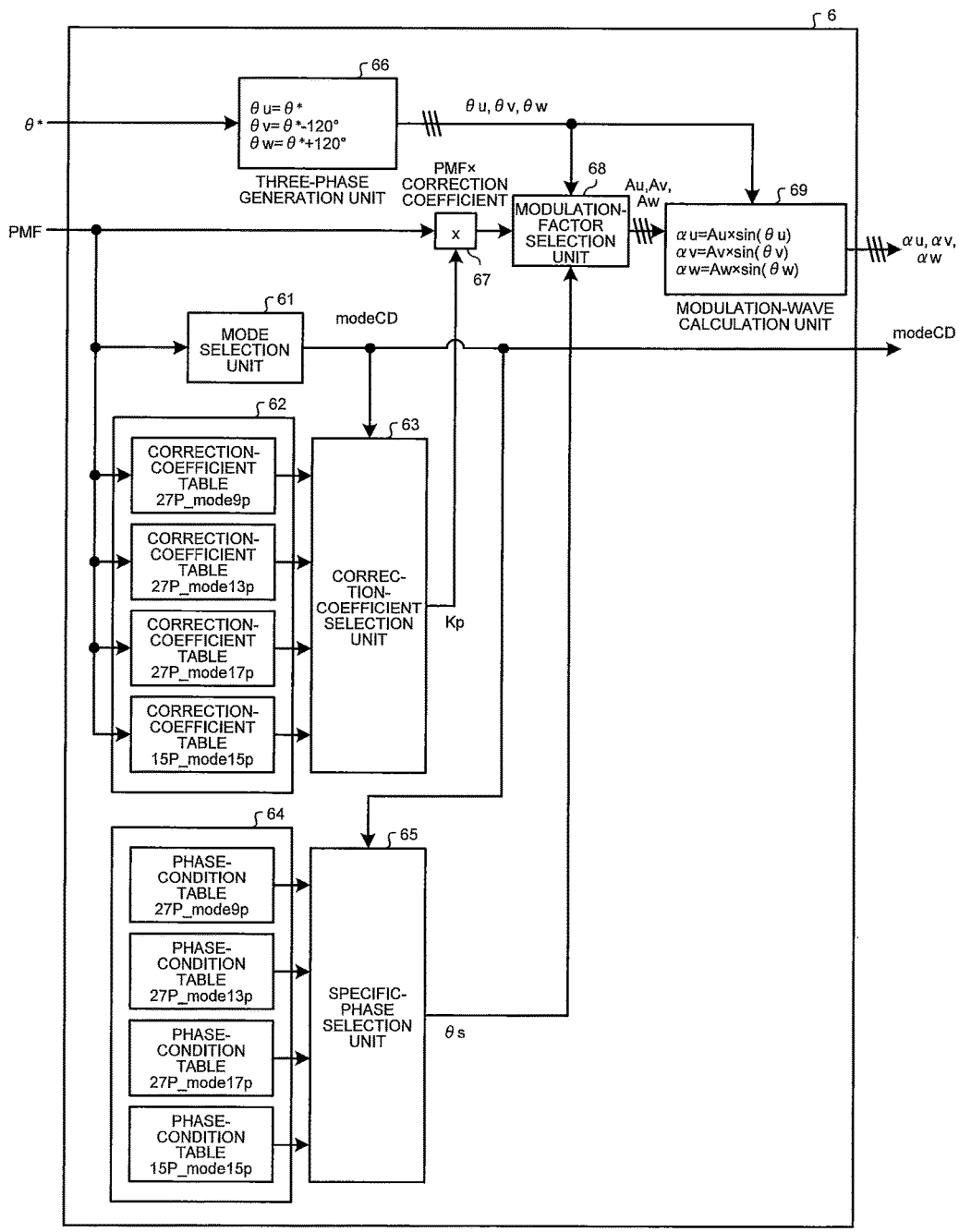
FIG. 3 is a diagram illustrating a configuration example of a modulation-wave generation unit according to the first embodiment.

Next, the modulation-wave generation unit 6 is described in detail with reference to FIG. 3. FIG. 3 is a diagram illustrating a configuration example of the modulation-wave generation unit 6. As illustrated in FIG. 3, the modulation-wave generation unit 6 is configured to include a mode selection unit 61, a correction-coefficient table group 62, a correction-coefficient selection unit 63, a phase-condition table group 64, a specific-phase selection unit 65, a three-phase generation unit 66, a multiplier 67, a modulation-factor selection unit 68, and a modulation-wave calculation unit 69.

The mode selection unit 61 generates the mode selection code modeCD based on the modulation factor PMF. Mode switching in the present embodiment is achieved by switching over the modulation mode described later based on this mode selection code modeCD. The generated mode selection code modeCD is output to the correction-coefficient selection unit 63 and the specific-phase selection unit 65. The processing in the mode selection unit 61 is described later in further detail.

In the correction-coefficient table group 62, a correction-coefficient table is provided to each modulation mode with each modulation factor PMF. In an overmodulation synchronous mode described later, because the switching is stopped independently from an output-voltage command value, this causes a voltage error to the output-voltage command. Therefore, in order to correct the voltage error, correction coefficients for correcting a voltage error are stored in the correction-coefficient table group 62. As an example, FIG. 3 illustrates a 27-wave overmodulation synchronous 9-pulse mode (hereinafter, represented as "27P_mode9p" as needed, and the same applies to the other modes), a 27-wave overmodulation synchronous 13-pulse mode (27P_mode13p), a 27-wave overmodulation synchronous 17-pulse mode (27P_mode17p), and a 15-wave non-overmodulation synchronous 15-pulse mode (15P_mode15p).

"Overmodulation" means that the instantaneous value of the modulation wave is controlled so as to become equal to or greater than the maximum amplitude of the waveform of the carrier wave, or become equal to or less than the minimum amplitude thereof, or the instantaneous value of the modulation wave is in a controlled state in which it is equal to or greater than this maximum amplitude, or equal to or less than this minimum amplitude. The modes described above are merely examples. It is obvious that modes with a different number of pulses are allowed. The modulation modes assumed in the first embodiment, including the above modulation modes, and the details on these modulation modes, are described later.

The modulation factor PMF is input to the correction-coefficient table group 62. The correction coefficient in accordance with the modulation factor PMF, that is, a candidate value for the correction coefficient is selected from each correction-coefficient table, and then input to the correction-coefficient selection unit 63.

In addition to the candidate values for the correction coefficient, the mode selection code modeCD from the mode selection unit 61 is input to the correction-coefficient selection unit 63. The correction-coefficient selection unit 63 selects a correction coefficient that corresponds to the mode selection code modeCD from among the candidate values of the correction coefficient, and outputs the selected correction coefficient to the multiplier 67. The processing in the correction-coefficient selection unit 63 is described later in further detail.

In the phase-condition table group 64, a phase-angle value, referred to as "specific phase", for determining a specific-phase section, is stored for each of modulation modes among the overmodulation synchronous modes in the present embodiment. Where the specific phase is represented as θs, this specific phase θs can be defined as the following equation, for example.

$$\theta s = Nover/Nca \times 90 \quad [\text{deg}] \quad (4)$$
$$= Nover/Nca \times (\pi/2) \quad [\text{rad}]$$

In the above equation (4), the meaning of "Nover" and "Nca" is as follows.

Nover: The number of output pulses at the time of overmodulation

Nca: The wave number of carrier wave in one cycle of modulation wave

The phase-condition table group 64 is configured to store therein the phase-angle values calculated in advance. However, it is not necessary to particularly limit the phase-condition table group 64 to this configuration. It is also possible that the phase-condition table group 64 is configured to always calculate a phase-angle value by the above equation (4).

Referring back to FIG. 3, the candidate values for the specific phase θs stored in the phase-condition table group 64 are input to the specific-phase selection unit 65. The specific-phase selection unit 65 selects a specific phase θs that corresponds to the mode selection code modeCD from among the candidate values for the specific phase θs, and outputs the selected specific phase θs to the modulation-factor selection unit 68. The processing in the specific-phase selection unit 65 is described later in further detail.

The output-voltage phase-angle command θ* is input to the three-phase generation unit 66. Based on the output-voltage phase-angle command θ* input to the three-phase generation unit 66, the three-phase generation unit 66 generates phase angles θu, θv, and θw, used for generating the modulation waves αu, αv, and αw (hereinafter, referred to as "modulation-wave phase angle"), and outputs the generated phase angles θu, θv, and θw to the modulation-factor selection unit 68 and the modulation-wave calculation unit 69.

The modulation factor PMF, and a correction coefficient Kp from the correction-coefficient selection unit 63, are input to the multiplier 67. The multiplier 67 multiplies the modulation factor PMF by the correction coefficient Kp, and outputs the multiplication result to the modulation-factor selection unit 68.

In addition to the correction coefficient Kp, the specific phase θs from the specific-phase selection unit 65, and the modulation-wave phase angles θu, θv, and θw generated by the three-phase generation unit 66, are input to the modulation-factor selection unit 68. The modulation-factor selection unit 68 compares the magnitude relation between the specific phase θs and each of the modulation-wave phase angles θu, θv, and θw. Based on the comparison results of the magnitude relation, the modulation-factor selection unit 68 selects either the modulation factor PMF corrected by the multiplier 67, or the default value of the modulation factor, which is set within the modulation-factor selection unit 68, and outputs the selected modulation factor to the modulation-wave calculation unit 69. In order to suppress generation of narrow pulses, this default value is set to such a value as to ensure that the value of the modulation wave, output from the modulation-wave generation unit 6, is greater than the value of the carrier wave. The output of the modulation-factor selection unit 68 is used as modulation factors Au, Av, and Aw for the modulation-wave calculation unit 69 to generate modulation waves αu, αv, and αw.

It is commonly known that as the modulation factor PMF is closer to 1, narrow switching pulses (hereinafter, referred to as "narrow pulses") are generated at and around the peak value of an output-voltage command. The modulation-factor selection unit 68 outputs the modulation factors Au, Av, and Aw that are the values of modulation factor for preventing generation of the narrow pulses, and that are hereinafter referred to as "narrow-pulse prevention modulation factor". The processing in the modulation-factor selection unit 68 is described later in further detail.

The modulation-wave phase angles θu, θv, and θw generated by the three-phase generation unit 66, and the narrow-pulse prevention modulation factors Au, Av, and Aw generated by the modulation-factor selection unit 68, are input to the modulation-wave calculation unit 69. By using the modulation-wave phase angles θu, θv, and θw, and the narrow-pulse prevention modulation factors Au, Av, and Aw, the modulation-wave calculation unit 69 generates the modulation waves αu, αv, and αw in accordance with the following equation.

$$\alpha u = Au \times \sin(\theta u)$$

$$\alpha v = Av \times \sin(\theta v)$$

$$\alpha w = Aw \times \sin(\theta w) \quad (5)$$

Figure 4:
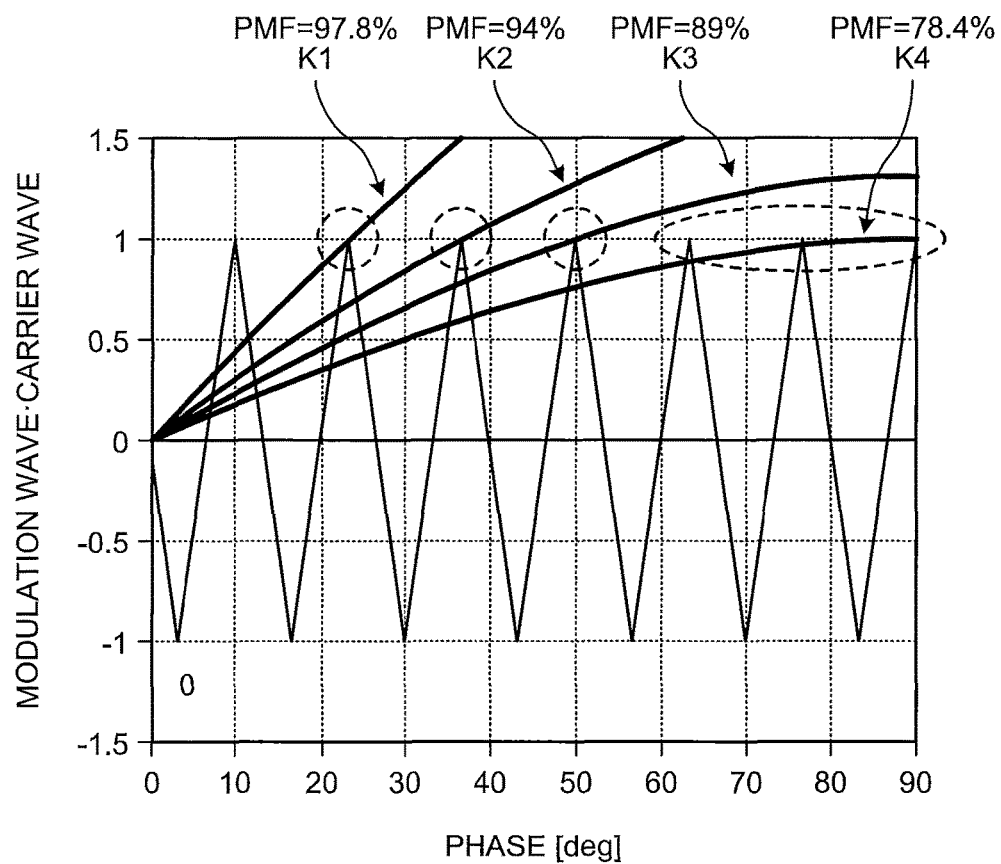
FIG. 4 is an explanatory diagram of generation of narrow pulses.
Figure 5:
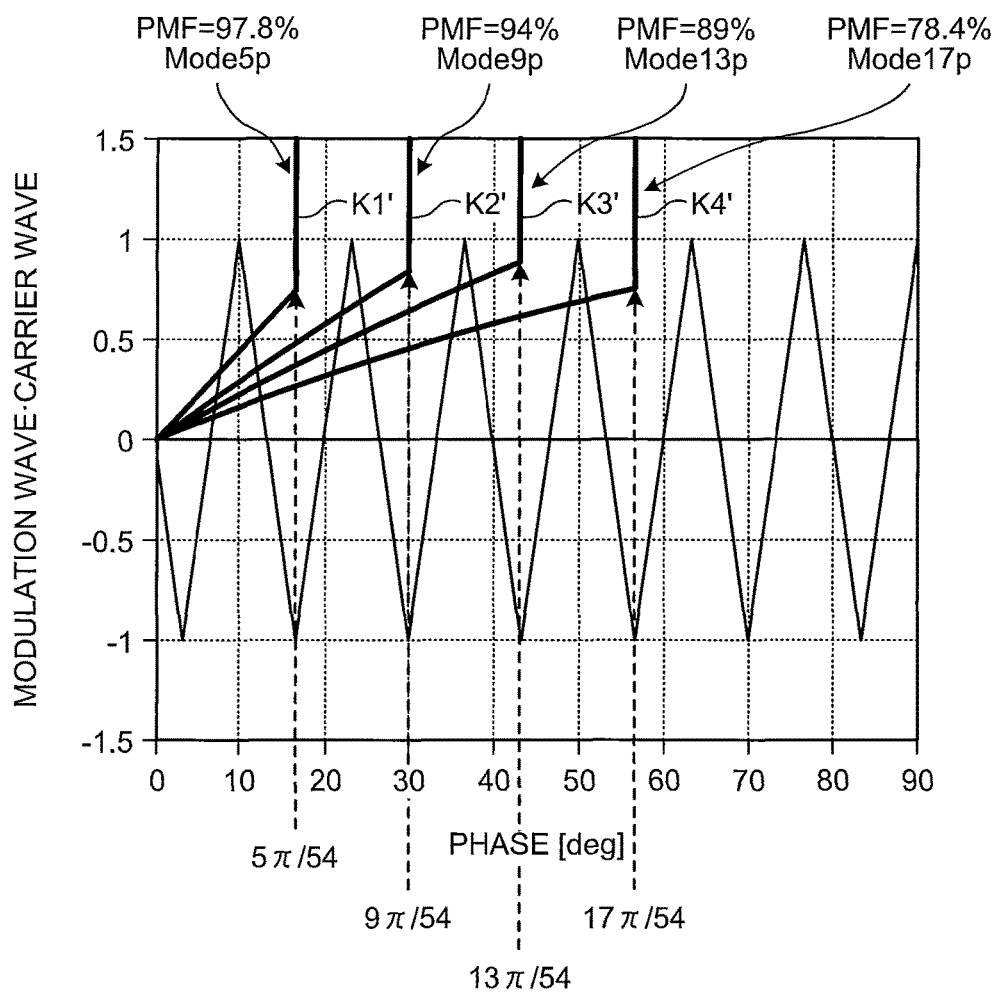
FIG. 5 is an explanatory diagram of a method for suppressing the generation of narrow pulses.

Next, the modulation modes assumed in the first embodiment, and the details on these modulation modes are described with reference to FIGS. 4 and 5. FIG. 4 is an explanatory diagram of generation of narrow pulses in the PWM control. FIG. 5 is an explanatory diagram of a method for suppressing the generation of narrow pulses. In both of FIGS. 4 and 5, the thin solid line shows the waveform of the carrier wave in a synchronous 27-pulse mode (the wave number in one cycle=27) in the area of ¼ cycle, that is, where the phase angle ranges from 00 to 90°. Further, among the waveforms shown by the bold solid line, a waveform K1 is a waveform of the modulation wave when the modulation factor PMF=97.8%. Similarly, a waveform K2 is a waveform of the modulation wave when the modulation factor PMF=94%. A waveform K3 is a waveform of the modulation wave when the modulation factor PMF=89%. A waveform K4 is a waveform of the modulation wave when the modulation factor PMF=78.4%. Each of the modulation factors is illustrated as an example of the modulation factor when the modulation wave contacts with the peak of the triangular carrier wave.

In FIG. 4, it is understood that in the portions shown by the dotted line, the phase-angle width is small at the intersection portion of the modulation wave and the carrier wave. At a modulation factor near each of the modulation factors illustrated as examples in FIG. 4, it is difficult to prevent generation of the narrow pulses in the portions shown by the dotted line in FIG. 4. It is commonly known that when the narrow pulses are generated, this causes oscillations in the output voltage.

In contrast to this, the power conversion device executes a control to suppress generation of the narrow pulses by the method illustrated in FIG. 5. Specifically, in a specific-phase section in which the phase angle exceeds a certain specific phase, the modulation factor is changed to a greater value independently regardless of the output-voltage command such that the value of the modulation wave is normally greater than the value of the carrier wave, and the magnitude relation between the modulation wave and the carrier wave is maintained, and then the switching is stopped. In the example illustrated in FIG. 5, the value of the modulation wave in the specific-phase section is set to a value equal to or greater than 1.5. However, the value of the modulation wave may be set to any value as long as it is greater than the carrier-wave amplitude. Also, the value of the modulation wave is not necessarily a constant value as long as it is greater than the carrier-wave amplitude. Further, the values of the modulation wave in the respective modes do not need to be equal. Furthermore, as described above, in the present embodiment, the switching is stopped by setting the value of the modulation wave to a value different from the normal sine wave in the specific-phase section. However, during the specific-phase section, it is also possible to stop the switching by setting the value of the carrier wave to a value different from the triangular wave or other waves (for example, an arbitrary value equal to or smaller than 0 on the positive side of AC output, and an arbitrary value equal to or larger than 0 on the negative side of AC output) such that the magnitude relation between the modulation wave and the carrier wave is maintained.

For example, in the configuration in FIG. 3, the control described above corresponds to the processing for multiplying the modulation factor PMF by the correction coefficient Kp in the correction-coefficient selection unit 63, the multiplier 67, and the modulation-factor selection unit 68. In this control, for example in the case of a waveform K4' of the modulation wave where the modulation factor PMF=78.4%, when the phase angle exceeds 17π/54, the modulation factor is changed to have a greater value. This phase angle 17π/54 is the specific phase θs shown in the above equation (4). Due to this operation, PWM pulses are generated in 4.25 triangular waves within the phase angle between 0° and 17π/54 [rad]. However, PWM pulses are not generated in 2.5 triangular waves within the phase angle between 17π/54 [rad] and 90°, but normally-on signals are generated. This operation can prevent generation of the narrow pulses, and therefore can suppress oscillations in the output voltage. This makes it possible to suppress the occurrence of inductive interference.

Within the phase angle equal to or greater than 90°, the control is executed symmetrically with respect to the straight line passing through the 90°-point and the 270°-point, and perpendicular to the horizontal axis. Therefore, in the case of the waveform K4', 17 (=4.25×4) PWM pulses are generated in one cycle, while 10 (=2.5×4) PWM pulses are not generated. That is, in the case of the waveform K4', generation of 10 PWM pulses out of 27 (=17+10) PWM pulses is cancelled by the overmodulation control, and 17 (=27−10) PWM pulses are generated by this control. This is the reason why the control mode with the waveform K4' is referred to as "27-wave overmodulation synchronous 17-pulse mode", or represented as "27P_Mode17p".

In FIG. 5, the same applies to waveforms K1' to K3'. These waveforms K1' to K3' are modulation-wave waveforms for generating "27-wave overmodulation synchronous 5-pulse mode (27P_Mode5p)", "27-wave overmodulation synchronous 9-pulse mode (27P_Mode9p)", and "27-wave overmodulation synchronous 13-pulse mode (27P_Mode13p)", respectively.

In the first embodiment, in addition to the above modes, a synchronous pulse mode in which overmodulation is not performed, a 15-wave mode in which the wave number of the carrier wave in one cycle of the modulation wave is reduced from 27 to 15, and a mode that combines these modes, are also used. The modulation modes in the first embodiment are listed as follows.

(When the wave number in one cycle of carrier wave is "27")
(a1) 27-wave non-overmodulation synchronous 27-pulse mode (27P_mode27p)

The number of pulses in one cycle of carrier wave: 27 pulses

The number of pulses to be eliminated around 90° and 270° in each phase: 0

Specific phase θs: None or π/2 [rad]

Additional explanation: Equivalent to normal synchronous 27-pulse mode in which overmodulation is not performed (a2) 27-wave overmodulation synchronous 17-pulse mode (27P_mode17p)

The number of pulses in one cycle of carrier wave: 17 pulses

The number of pulses to be eliminated around 90° and 270° in each phase: 5 pulses, respectively Specific phase θs=17π/54 [rad]

(a3) 27-wave overmodulation synchronous 13-pulse mode (27P_mode13p)

The number of pulses in one cycle of carrier wave: 13 pulses

The number of pulses to be eliminated around 90° and 270° in each phase: 7 pulses, respectively Specific phase θs=13π/54 [rad]

(a4) 27-wave overmodulation synchronous 9-pulse mode (27P_mode9p)

The number of pulses in one cycle of carrier wave: 9 pulses

The number of pulses to be eliminated around 90° and 270° in each phase: 9 pulses, respectively Specific phase θs=9π/54 [rad]

(a5) 27-wave overmodulation synchronous 5-pulse mode (27P_mode5p)

The number of pulses in one cycle of carrier wave: 5 pulses

The number of pulses to be eliminated around 90° and 270° in each phase: 11 pulses, respectively Specific phase θs=5π/54 [rad]

(a6) 27-wave overmodulation synchronous 1-pulse mode (27P_mode1p)

The number of pulses in one cycle of carrier wave: 1 pulse

The number of pulses to be eliminated around 90° and 270° in each phase: 13 pulses, respectively Specific phase θs=π/54 [rad] or zero Additional explanation: Same as normal synchronous 1-pulse mode (When the wave number in one cycle of carrier wave is "21")

(b1) 21-wave non-overmodulation synchronous 21-pulse mode (21P_mode21p)

The number of pulses in one cycle of carrier wave: 21 pulses

The number of pulses to be eliminated around 90° and 270° in each phase: 0

Specific phase θs: None or π/2 [rad]

Additional explanation: Equivalent to normal synchronous 21-pulse mode in which overmodulation is not performed (b2) 21-wave overmodulation synchronous 17-pulse mode (21P_mode17p)

The number of pulses in one cycle of carrier wave: 17 pulses

The number of pulses to be eliminated around 90° and 270° in each phase: 2 pulses, respectively Specific phase θs=17π/42 [rad]

(b3) 21-wave overmodulation synchronous 13-pulse mode (21P_mode13p)

The number of pulses in one cycle of carrier wave: 13 pulses

The number of pulses to be eliminated around 90° and 270° in each phase: 4 pulses, respectively Specific phase θs=13π/42 [rad]

(b4) 21-wave overmodulation synchronous 9-pulse mode (21P_mode9p)

The number of pulses in one cycle of carrier wave: 9 pulses

The number of pulses to be eliminated around 90° and 270° in each phase: 6 pulses, respectively Specific phase θs=9π/42 [rad]

(b5) 21-wave overmodulation synchronous 5-pulse mode (21P_mode5p)

The number of pulses in one cycle of carrier wave: 5 pulses

The number of pulses to be eliminated around 90° and 270° in each phase: 8 pulses, respectively Specific phase θs=5π/42 [rad]

(b6) 21-wave overmodulation synchronous 1-pulse mode (21P_mode1p)

The number of pulses in one cycle of carrier wave: 1 pulse

The number of pulses to be eliminated around 90° and 270° in each phase: 10 pulses, respectively Specific phase θs=π/42 [rad] or zero Additional explanation: Same as normal synchronous 1-pulse mode (When the wave number in one cycle of carrier wave is "15")

(c1) 15-wave non-overmodulation synchronous 15-pulse mode (15P_mode15p)

The number of pulses in one cycle of carrier wave: 15 pulses

The number of pulses to be eliminated around 90° and 270° in each phase: 0

Specific phase θs: None or π/2 [rad]

Additional explanation: Equivalent to normal synchronous 21-pulse mode in which overmodulation is not performed (c2) 15-wave overmodulation synchronous 13-pulse mode (15P_mode13p)

The number of pulses in one cycle of carrier wave: 13 pulses

The number of pulses to be eliminated around 90° and 270° in each phase: 1 pulse, respectively Specific phase θs=13π/30 [rad]

(c3) 15-wave overmodulation synchronous 9-pulse mode (15P_mode9p)

The number of pulses in one cycle of carrier wave: 9 pulses

The number of pulses to be eliminated around 90° and 270° in each phase: 3 pulses, respectively Specific phase θs=3π/10 [rad]

(c4) 15-wave overmodulation synchronous 5-pulse mode (15P_mode5p)

The number of pulses in one cycle of carrier wave: 5 pulses

The number of pulses to be eliminated around 90° and 270° in each phase: 5 pulses, respectively Specific phase θs=π/6

(c5) 15-wave overmodulation synchronous 1-pulse mode (15P_mode1p)

The number of pulses in one cycle of carrier wave: 1 pulse

The number of pulses to be eliminated around 90° and 270° in each phase: 7 pulses, respectively Specific phase θs=π/30 [rad] or zero Additional explanation: Same as normal synchronous 1-pulse mode (When the wave number in one cycle of carrier wave is "9")

(d1) 9-wave non-overmodulation synchronous 9-pulse mode (9P_mode9p)

The number of pulses in one cycle of carrier wave: 9 pulses

The number of pulses to be eliminated around 90° and 270° in each phase: 0

Specific phase θs: None or π/2 [rad]

Additional explanation: Equivalent to normal synchronous 9-pulse mode in which overmodulation is not performed (d2) 9-wave overmodulation synchronous 5-pulse mode (9P_mode5p)

The number of pulses in one cycle of carrier wave: 5 pulses

The number of pulses to be eliminated around 90° and 270° in each phase: 2 pulses, respectively Specific phase θs=5π/18 [rad]

(d3) 9-wave overmodulation synchronous 1-pulse mode (9P_mode1p)

The number of pulses in one cycle of carrier wave: 1 pulse

The number of pulses to be eliminated around 90° and 270° in each phase: 4 pulses, respectively Specific phase θs=π/18 [rad] or zero Additional explanation: Same as normal synchronous 1-pulse mode Each of the modes illustrated above in (a1) to (a6), (b1) to (b6), (c1) to (c5), and (d1) to (d3) is used for the case where the carrier wave has a waveform extending downward from the reference phase 0°, that is, extending toward the negative-value side as illustrated in FIGS. 4 and 5 (hereinafter, "downwardly-starting carrier wave"). Although not illustrated, in the case where the carrier wave has a waveform extending upward from the reference phase 0°, that is, extending toward the positive-value side (hereinafter, "upwardly-starting carrier wave"), the modulation mode is different in "the number of pulses to be eliminated" and "the specific phase" as follows. In order to distinguish the mode with the upwardly-starting carrier wave from the mode with the downwardly-starting carrier wave, the mode with the upwardly-starting carrier wave is represented with the word "inverse" or the letter "n" added to the beginning.

(Upwardly-starting carrier wave: When the wave number in one cycle is "27")

(f1) Inverse 27-wave non-overmodulation synchronous 27-pulse mode (n27P_mode27p)

The number of pulses in one cycle of carrier wave: 27 pulses

The number of pulses to be eliminated around 90° and 270° in each phase: 0

Specific phase θs: None or π/2 [rad]

Additional explanation: Equivalent to synchronous 27-pulse mode in which overmodulation is not performed (f2) Inverse 27-wave overmodulation synchronous 15-pulse mode (n27P_mode15p)

The number of pulses in one cycle of carrier wave: 15 pulses

The number of pulses to be eliminated around 90° and 270° in each phase: 6 pulses, respectively Specific phase θs=15π/54 [rad]

(f3) Inverse 27-wave overmodulation synchronous 11-pulse mode (n27P_mode11p)

The number of pulses in one cycle of carrier wave: 11 pulses

The number of pulses to be eliminated around 90° and 270° in each phase: 8 pulses, respectively Specific phase θs=11π/54 [rad]

(f4) Inverse 27-wave overmodulation synchronous 7-pulse mode (n27P_mode7p)

The number of pulses in one cycle: 7 pulses [rad]

The number of pulses to be eliminated around 90° and 270° in each phase: 10 pulses, respectively Specific phase θs=7π/54 [rad]

(f5) Inverse 27-wave overmodulation synchronous 3-pulse mode (n27P_mode3p)

The number of pulses in one cycle of carrier wave: 3 pulses

The number of pulses to be eliminated around 90° and 270° in each phase: 12 pulses, respectively Specific phase θs=π/18 [rad]

(f6) Inverse 27-wave overmodulation synchronous 1-pulse mode (n27P_mode1p)

The number of pulses in one cycle of carrier wave: 1 pulse

The number of pulses to be eliminated around 90° and 270° in each phase: 13 pulses, respectively Specific phase θs=π/54 [rad] or zero Additional explanation: Same as synchronous 1-pulse mode (Upwardly-starting carrier wave: When the wave number in one cycle is "21")

(g1) Inverse 21-wave non-overmodulation synchronous 21-pulse mode (n21P_mode21p)

The number of pulses in one cycle of carrier wave: 21 pulses

The number of pulses to be eliminated around 90° and 270° in each phase: 0

Specific phase θs: None or π/2 [rad]

Additional explanation: Equivalent to synchronous 21-pulse mode in which overmodulation is not performed (g2) Inverse 21-wave overmodulation synchronous 15-pulse mode (n21P_mode15p)

The number of pulses in one cycle of carrier wave: 15 pulses

The number of pulses to be eliminated around 90° and 270° in each phase: 3 pulses, respectively Specific phase θs=5π/14 [rad]

(g3) Inverse 21-wave overmodulation synchronous 11-pulse mode (n21P_mode11p)

The number of pulses in one cycle of carrier wave: 11 pulses

The number of pulses to be eliminated around 90° and 270° in each phase: 5 pulses, respectively Specific phase θs=11π/42 [rad]

(g4) Inverse 21-wave overmodulation synchronous 7-pulse mode (n21P_mode7p)

The number of pulses in one cycle of carrier wave: 7 pulses

The number of pulses to be eliminated around 90° and 270° in each phase: 7 pulses, respectively Specific phase θs=π/6 [rad]

(g5) Inverse 21-wave overmodulation synchronous 3-pulse mode (n21P_mode3p)

The number of pulses in one cycle of carrier wave: 3 pulses

The number of pulses to be eliminated around 90° and 270° in each phase: 9 pulses, respectively Specific phase θs=π/14 [rad]

(g6) Inverse 21-wave overmodulation synchronous 1-pulse mode (n21P_mode1p)

The number of pulses in one cycle of carrier wave: 1 pulse

The number of pulses to be eliminated around 90° and 270° in each phase: 10 pulses, respectively Specific phase θs=π/42 [rad] or zero Additional explanation: Same as synchronous 1-pulse mode (Upwardly-starting carrier wave: When the wave number in one cycle is "15")

Figure 6:
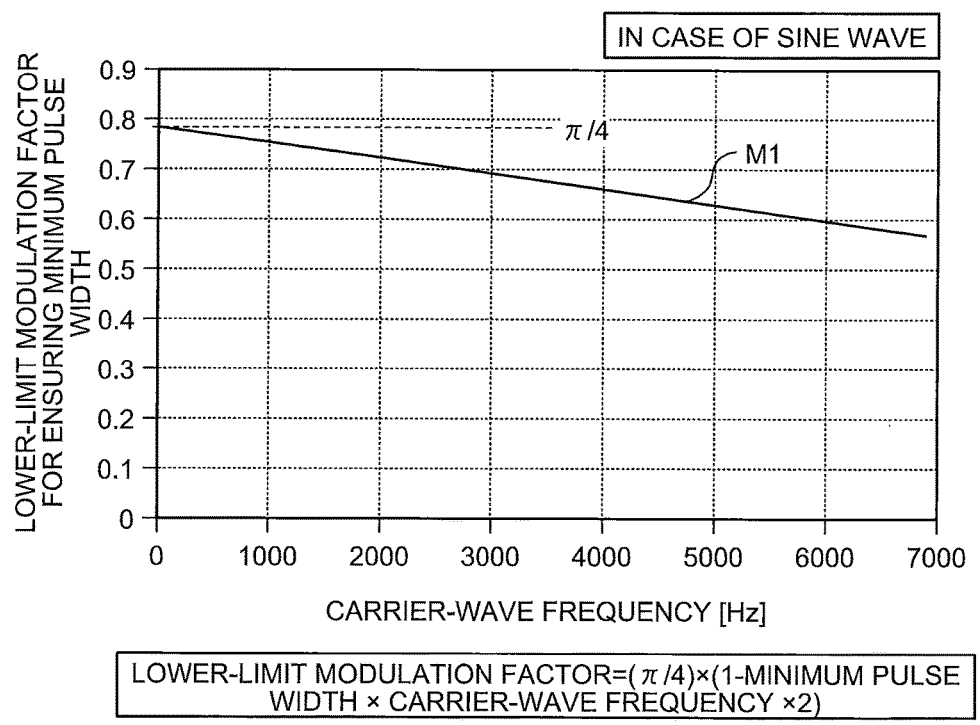
FIG. 6 is a diagram illustrating a relation between a carrier-wave frequency and a lower-limit modulation factor for ensuring a minimum pulse width.

(h1) Inverse 15-wave non-overmodulation synchronous 15-pulse mode (n15P_mode15p)
The number of pulses in one cycle of carrier wave: 15 pulses
The number of pulses to be eliminated around 90° and 270° in each phase: 0
Specific phase θs: None or π/2 [rad]
Additional explanation: Equivalent to synchronous 15-pulse mode in which overmodulation is not performed
(h2) Inverse 15-wave overmodulation synchronous 11-pulse mode (n15P_mode11p)
The number of pulses in one cycle of carrier wave: 11 pulses
The number of pulses to be eliminated around 90° and 270° in each phase: 2 pulses, respectively
Specific phase θs=11π/30 [rad]
(h3) Inverse 15-wave overmodulation synchronous 7-pulse mode (n15P_mode7p)
The number of pulses in one cycle of carrier wave: 7 pulses
The number of pulses to be eliminated around 90° and 270° in each phase: 4 pulses, respectively
Specific phase θs=7π/30 [rad]
(h4) Inverse 15-wave overmodulation synchronous 3-pulse mode (n15P_mode3p)
The number of pulses in one cycle of carrier wave: 3 pulses
The number of pulses to be eliminated around 900 and 270° in each phase: 6 pulses, respectively
Specific phase θs=π/10 [rad]
(h5) Inverse 15-wave overmodulation synchronous 1-pulse mode (n15P_mode1p)
The number of pulses in one cycle of carrier wave: 1 pulse
The number of pulses to be eliminated around 90° and 270° in each phase: 7 pulses, respectively
Specific phase θs=π/30 [rad] or zero
Additional explanation: Same as synchronous 1-pulse mode (Upwardly-starting carrier wave: When the wave number in one cycle is "9")
(j1) Inverse 9-wave non-overmodulation synchronous 9-pulse mode (n9P_mode9p)
The number of pulses in one cycle of carrier wave: 9 pulses
The number of pulses to be eliminated around 90° and 270° in each phase: 0
Specific phase θs: None or π/2 [rad]
Additional explanation: Equivalent to synchronous 9-pulse mode in which overmodulation is not performed
(j2) Inverse 9-wave overmodulation synchronous 7-pulse mode (n9P_mode7p)
The number of pulses in one cycle of carrier wave: 7 pulses
The number of pulses to be eliminated around 90° and 270° in each phase: 1 pulse, respectively
Specific phase θs=7π/18 [rad]
(j3) Inverse 9-wave overmodulation synchronous 3-pulse mode (n9P_mode3p)
The number of pulses in one cycle of carrier wave: 3 pulses
The number of pulses to be eliminated around 90° and 270° in each phase: 3 pulses, respectively
Specific phase θs=π/6 [rad]
(j4) Inverse 9-wave overmodulation synchronous 1-pulse mode (n9P_mode1p)
The number of pulses in one cycle of carrier wave: 1 pulse
The number of pulses to be eliminated around 90° and 270° in each phase: 4 pulses, respectively
Specific phase θs=π/18 [rad] or zero
Additional explanation: Same as synchronous 1-pulse mode FIG. 6 is a diagram illustrating the relation between the carrier-wave frequency and the lower-limit modulation factor for ensuring a minimum pulse width, where this minimum pulse width is 20 [μsec]. "Minimum pulse width" is the minimum period, during which the switching elements in the power conversion unit 2 need to be continuously on in order that these switching elements can achieve a stabilized switching operation (hereinafter, referred to as "minimum-on period"). In some cases, the switching elements are required to maintain the on-state after they are turned on, in order to stabilize their on-state. In order to ensure the minimum-on period as described above, the switching-signal generation unit 4 is sometimes provided therein with a function of outputting a switching signal in order that, even when a pulse that is narrower than the minimum pulse width is input as a command value, the switching elements are still on for the minimum pulse width, not according to the narrower-pulse command. This function is referred to as "minimum-on function".

In FIG. 6, the horizontal axis represents the carrier-wave frequency, and the vertical axis represents the lower-limit modulation factor. A boundary line M1 illustrated by the solid line shows the lower-limit modulation factor that changes depending on the carrier-wave frequency. This lower-limit modulation factor is a function of "minimum pulse width [s]" and "carrier-wave frequency [Hz]", and can be expressed as the following equation.

$$\text{Lower-limit modulation factor} = (\pi/4) \times (1 - \text{minimum pulse width} \times \text{carrier-wave frequency} \times 2) \qquad (6)$$

As illustrated in FIG. 6, when the minimum pulse width is 20 [ρsec], the lower-limit modulation factor is "approximately 0.7" at the carrier-wave frequency of 3000 Hz for example, and the lower-limit modulation factor is "approximately 0.6" at the carrier-wave frequency of 6000 Hz for example. It is necessary to decrease the lower-limit modulation factor as the carrier-wave frequency becomes higher. However, the lower-limit modulation factor for ensuring the minimum pulse width does not need to be the point on the boundary line M1. When a value that does not exceed the value on the boundary line M1 is selected, then a switching signal with a pulse width greater than the minimum pulse width can be generated.

The overmodulation mode is applied to the conventional power conversion device when the modulation factor becomes equal to or greater than π/4. Therefore, when the carrier-wave frequency is high, narrow pulses are sometimes generated even though the modulation factor is less than π/4. In contrast, the power conversion device according to the first embodiment reduces the lower-limit modulation factor in accordance with the carrier-wave frequency, and executes the control in the overmodulation mode when the modulation factor PMF calculated from the output-voltage command |V*| is equal to or greater than the lower-limit modulation factor. Therefore, the power conversion device according to the first embodiment can suppress generation of the narrow pulses, and is accordingly capable of suppressing oscillations in the output voltage ascribed to the narrow pulses.

Next, the operation of the mode selection unit 61 is described in further detail. In the descriptions below, the modulation mode is assumed to use a downwardly-starting carrier wave, unless otherwise specified.

Figure 7:
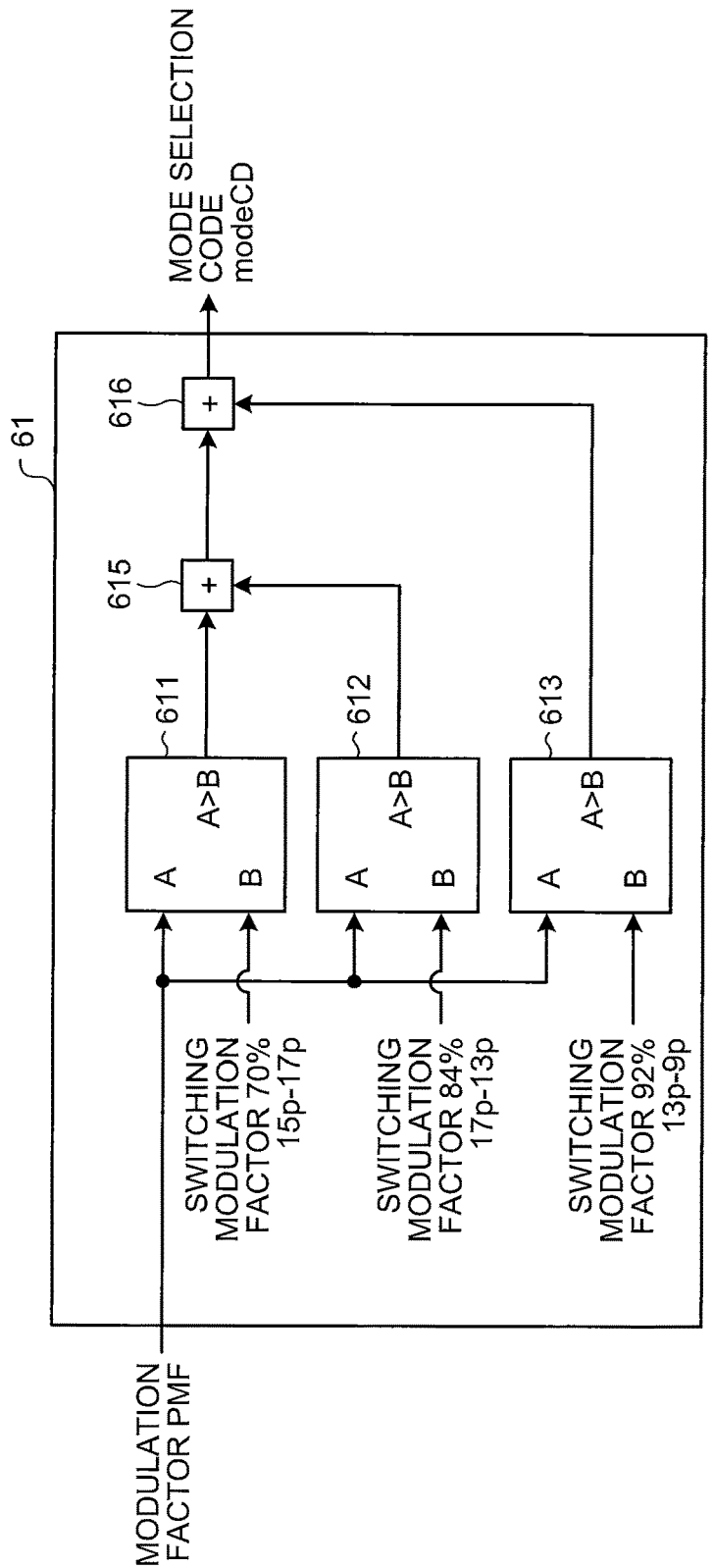
FIG. 7 is a diagram illustrating a configuration example of a mode selection unit according to the first embodiment.

FIG. 7 is a diagram illustrating a configuration example of the mode selection unit 61 illustrated in FIG. 3. As illustrated in FIG. 7, the mode selection unit 61 is configured to include three comparison determination devices 611 to 613, and two adders 615 and 616. Each of the comparison determination devices 611 to 613 includes an A-terminal and a B-terminal. The modulation factor PMF is input to each of the A-terminals. Meanwhile, a value to be input to the B-terminal differs between the comparison determination devices. Predetermined values of the modulation factors for switching over the respective modulation modes are input to the B-terminals. The comparison determination device 611 performs mode switching from "15-wave non-overmodulation synchronous 15-pulse mode" to "27-wave overmodulation synchronous 17-pulse mode". The comparison determination device 612 performs mode switching from "27-wave overmodulation synchronous 17-pulse mode" to "27-wave overmodulation synchronous 13-pulse mode". The comparison determination device 613 performs mode switching from "27-wave overmodulation synchronous 13-pulse mode" to "27-wave overmodulation synchronous 9-pulse mode".

For example, the value "70%", that is, "0.7" is input to the B-terminal of the comparison determination device 611. In the first embodiment, this value "70%" is a modulation factor for switching the modulation mode from "15-wave non-overmodulation synchronous 15-pulse mode" to "27-wave overmodulation synchronous 17-pulse mode". In the first embodiment, the modulation factor at the time of 180° energization in the 1-pulse mode is defined as "1", as described above. The value "70%", where this modulation factor in the 1-pulse mode is defined as "1", is a modulation factor for switching from "15-wave non-overmodulation synchronous 15-pulse mode" to "27-wave overmodulation synchronous 17-pulse mode". In FIG. 7, this switching modulation factor is represented as "switching modulation factor 70% 15p-17p". Other switching modulation factors are also represented in the same manner.

Subsequently, the switching modulation factor 84% is input to the B-terminal of the comparison determination device 612 when the modulation mode is switched from "27-wave overmodulation synchronous 17-pulse mode" to "27-wave overmodulation synchronous 13-pulse mode". The switching modulation factor 92% is input to the B-terminal of the comparison determination device 613 when the modulation mode is switched from "27-wave overmodulation synchronous 13-pulse mode" to "27-wave overmodulation synchronous 9-pulse mode". It is obvious that the values of mode-switching modulation factors are not limited to the specific values described above.

The comparison determination devices 611 to 613 output "1" when A>B is satisfied, and output "0" when A>B is not satisfied, that is, A≤B is satisfied. The adder 615 adds the output from the comparison determination device 612 to the output from the comparison determination device 611. The adder 616 adds the output from the comparison determination device 613 to the output from the adder 615. The output from the adder 616 is output as the mode selection code modeCD. The operation of the mode selection unit 61 described above is summarized as follows.

(1.1) Modulation mode: 15-wave non-overmodulation synchronous 15-pulse mode
Modulation factor: 70% or lower
Mode selection code modeCD=0
(1.2) Modulation mode: 27-wave overmodulation synchronous 17-pulse mode
Modulation factor: Higher than 70%, and 84% or lower
Mode selection code modeCD=1
(1.3) Modulation mode: 27-wave overmodulation synchronous 13-pulse mode
Modulation factor: Higher than 84%, and 92% or lower
Mode selection code modeCD=2
(1.4) Modulation mode: 27-wave overmodulation synchronous 9-pulse mode
Modulation factor: Higher than 92%
Mode selection code modeCD=3

The values of the modulation factors described above are modulation-factor condition values for executing the control to switch the modulation mode in the power conversion device from the mode of a larger number of pulses to the mode of a smaller number of pulses. The modulation-factor condition values described above are merely examples. It is also possible to use a value different from the above values so as not to generate narrow pulses. When the control is executed to switch the modulation mode in the power conversion device from the mode of a smaller number of pulses to the mode of a larger number of pulses, it is possible to provide hysteresis to modulation-factor condition values described above, in order to prevent chattering of the control operation. That is, hysteresis characteristics are given between the modulation-factor condition values for switching from the modulation mode of a larger number of pulses to the modulation mode of a smaller number of pulses and modulation-factor condition values for switching from the modulation mode of a smaller number of pulses to the modulation mode of a larger number of pulses. An effect is thereby obtained where chattering of the control operation can be prevented.

Figure 8:
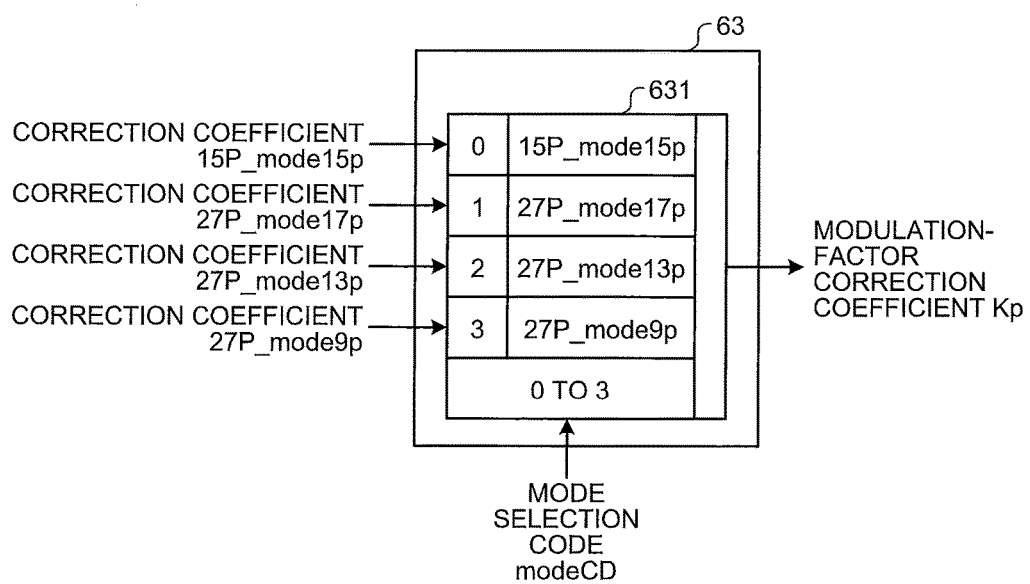
FIG. 8 is a diagram illustrating a configuration example of a correction-coefficient selection unit according to the first embodiment.

Next, the operation of the correction-coefficient selection unit 63 is described in further detail. FIG. 8 is a diagram illustrating a configuration example of the correction-coefficient selection unit 63 illustrated in FIG. 3. As illustrated in FIG. 8, the correction-coefficient selection unit 63 is configured to include a modulation-factor correction-coefficient storage unit 631. Correction coefficients that are set in advance in accordance with the modulation mode are input to the correction-coefficient selection unit 63. As illustrated in FIG. 8, in the modulation-factor correction-coefficient storage unit 631, storing areas are provided a in accordance with the mode selection code modeCD. Correction coefficients in accordance with the modulation modes are stored in the corresponding areas. For example, a correction coefficient for the 15-wave non-overmodulation synchronous 15-pulse mode is stored in the area described as "15P_mode15p". The correction-coefficient selection unit 63 uses the input mode selection code modeCD as an index to output the correction coefficient stored in the corresponding index area as a modulation-factor correction coefficient Kp.

The correction-coefficient setting method is described. As described above, in the overmodulation mode applied in the present embodiment, the switching is stopped without taking into account the output-voltage command in a specific-phase section. Therefore, the output voltage is increased by an amount equivalent to the switching stop in the specific-phase section. It is thus important to correct the output voltage in the normal switching section (also referred to as "second section") excluding the specific-phase section, so as to adjust the output voltage increased in the specific-phase section, in order that the output voltage becomes lower than the output-voltage command. Consequently, the correction coefficient is set such that the actual output voltage becomes lower than the output-voltage command.

Further, the length of specific-phase section differs between pulse modes in the overmodulation synchronous mode. Accordingly, the amount of output voltage to be corrected in the switching section also differs depending on the length of the specific-phase section. Therefore, as described in the present embodiment, it is desirable to prepare an optimum correction coefficient for each overmodulation synchronous mode. As the overmodulation synchronous mode shifts from the overmodulation synchronous 17-pulse mode to the overmodulation synchronous 5-pulse mode, the length of the specific-phase section is increased, and accordingly the amount of output voltage to be corrected is increased. In consideration of this, the optimum correction coefficient in each overmodulation synchronous mode is set in such a manner that as the number of pulses included in the overmodulation synchronous mode is decreased, the above correction amount in the switching section in each modulation mode is increased.

Figure 9:
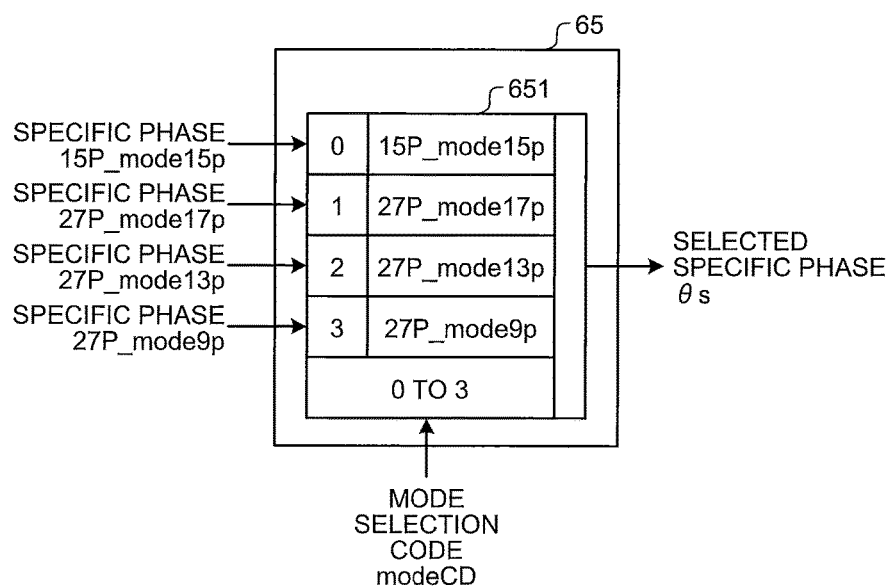
FIG. 9 is a diagram illustrating a configuration example of a specific-phase selection unit according to the first embodiment.

Next, the operation of the specific-phase selection unit 65 is described in further detail. FIG. 9 is a diagram illustrating a configuration example of the specific-phase selection unit 65 illustrated in FIG. 3. As illustrated in FIG. 9, the specific-phase selection unit 65 is configured to include a specific-phase storage unit 651. Specific phases that are set in advance in accordance with the modulation mode are input to the specific-phase selection unit 65. As illustrated in FIG. 9, in the specific-phase storage unit 651, storing areas are provided in accordance with the mode selection code modeCD. Specific phases in accordance with the modulation modes are stored in the corresponding areas. For example, a phase for the 27-wave overmodulation synchronous 17-pulse mode is stored in the area described as "27P_mode17p". The mode selection code modeCD is input to the specific-phase selection unit 65. The area is designated by the mode selection code modeCD as an index, and the specific phase θs stored in the corresponding area is selected and output.

Figure 10:
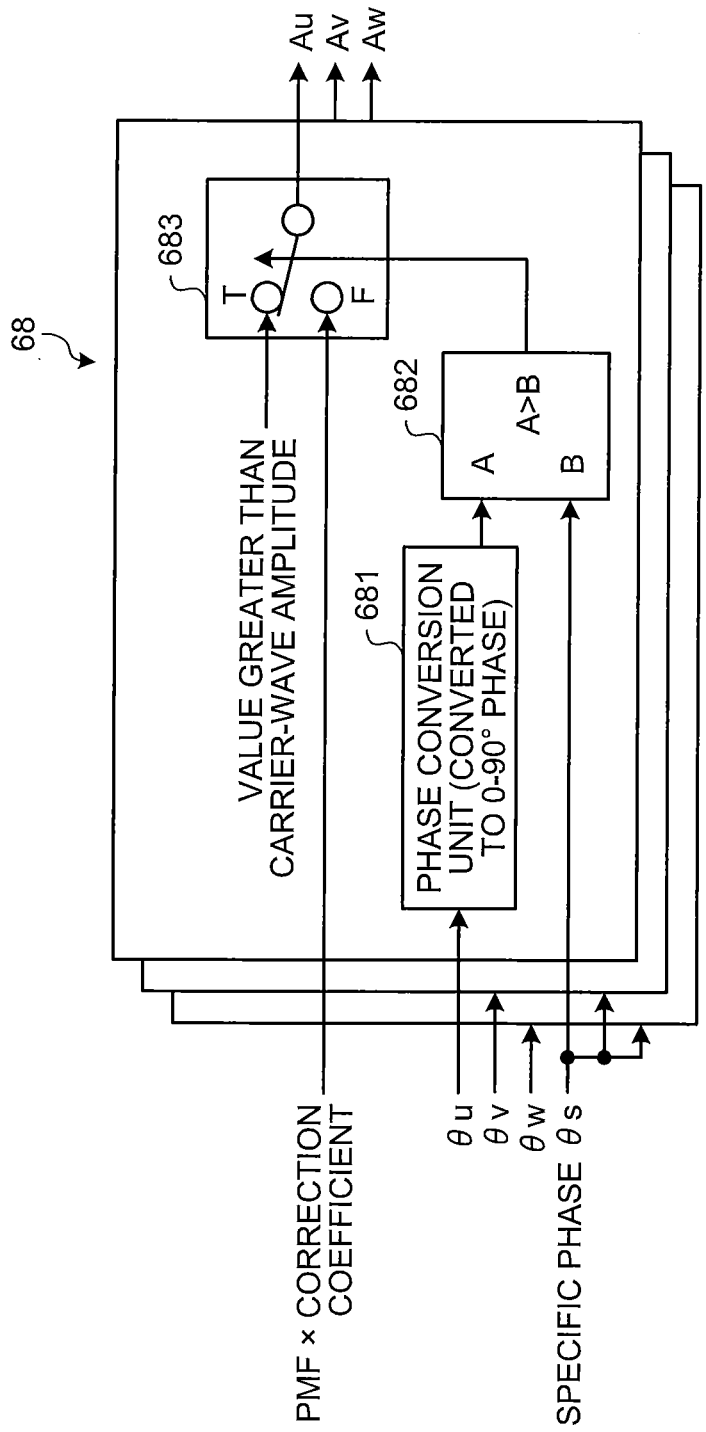
FIG. 10 is a diagram illustrating a configuration example of a modulation-factor selection unit according to the first embodiment.
Figure 11:
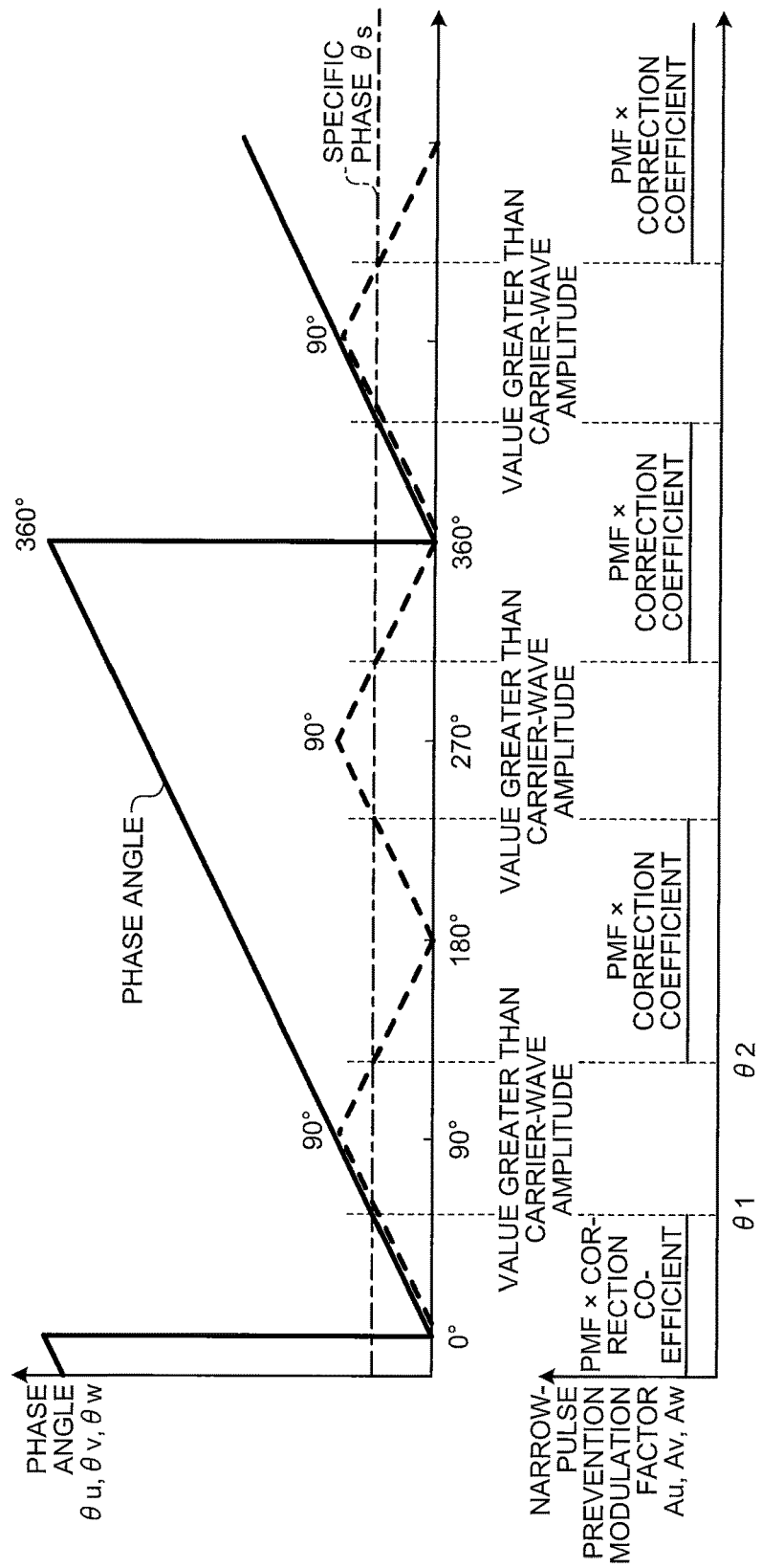
FIG. 11 is a diagram illustrating an operation example of the modulation-factor selection unit according to the first embodiment.

Next, the operation of the modulation-factor selection unit 68 is described in further detail with reference to FIGS. 10 and 11. FIG. 10 is a diagram illustrating a configuration example of the modulation-factor selection unit 68. FIG. 11 is a diagram illustrating an operation example of the modulation-factor selection unit 68. As illustrated in FIG. 10, the modulation-factor selection unit 68 is configured to include a phase conversion unit 681, a comparison determination device 682, and a modulation-wave amplitude switching unit 683. The modulation-factor selection unit 68 is provided for each of the U-phase, V-phase, and W-phase. The U-phase operation of the modulation-factor selection unit 68 is described below.

A modulation-wave phase angle θu is input to the phase conversion unit 681. The phase conversion unit 681 converts the value of the modulation-wave phase angle θu to a value that ranges from 0° to 90°. In the waveforms on the upper side of FIG. 11, the waveform illustrated by the bold solid line is a waveform of the phase angle θu to be input to the phase conversion unit 681. The triangular-shaped waveform illustrated by the bold dotted line is a waveform to be output by the phase conversion unit 681. Where the phase angles to be output by the phase conversion unit 681 are represented as θu', θv', and θw', the phase angle θu' can be expressed as the following equation, for example.

$$\theta u'=\theta u(0°\leq\theta u<90°)$$

$$\theta u'=180°-\theta u(90°\leq\theta u<180°)$$

$$\theta u'=\theta u-180°(180°\leq\theta u<270°)$$

$$\theta u'=360°-\theta u(270°\leq\theta u<360°) \qquad (7)$$

θv' and θw' can also be expressed in the same manner as the above equation (7).

The output from the phase conversion unit 681, that is, the phase angle θu is input to the A-terminal of the comparison determination device 682. The specific phase θs from the specific-phase selection unit 65 is input to the B-terminal. In the waveforms on the upper side of FIG. 11, the waveform illustrated by the dot-and-dash line drawn parallel to the horizontal axis represents the specific phase θs.

When the phase angle θu input to the A-terminal is smaller than the specific phase θs input to the B-terminal, that is, when θu<θs, the comparison determination device 682 outputs "0" (FALSE), and the modulation-wave amplitude switching unit 683 selects and outputs "PMF×correction coefficient". In contrast, when the phase angle θu is greater than or equal to the specific phase θs, that is, when θu≥θs, the comparison determination device 682 outputs "1" (TRUE), and the modulation-wave amplitude switching unit 683 selects and outputs "value greater than carrier-wave amplitude" set in advance. The output from the modulation-wave amplitude switching unit 683 is transmitted as a narrow-pulse prevention modulation factor Au to a processing unit at the subsequent stage, that is, to the modulation-wave calculation unit 69.

As illustrated in FIG. 11, phase angles θ at the intersection of the phase angle θu' illustrated by the bold dotted line, and the specific phase θs illustrated by the dot-and-dash line, are represented as θ1 and θ2. In the range, for example, where the phase angle θu is equal to or greater than 0°, and equal to or less than θ1, and where the phase angle θu is equal to or greater than θ2, and equal to or less than 180°, "PMF× correction coefficient" is selected as the narrow-pulse prevention modulation factors Au, Av, and Aw and output. In the range where the phase angle θu' is equal to or greater than θ1, and equal to or less than θ2, the set value, that is, "value greater than carrier-wave amplitude", input to the modulation-wave amplitude switching unit 683, is selected and output.

Because the modulation-factor selection unit 68 operates in the manner as described above, the method illustrated in FIG. 5 can be achieved. This makes it possible to suppress generation of the narrow pulses.

Figure 12:
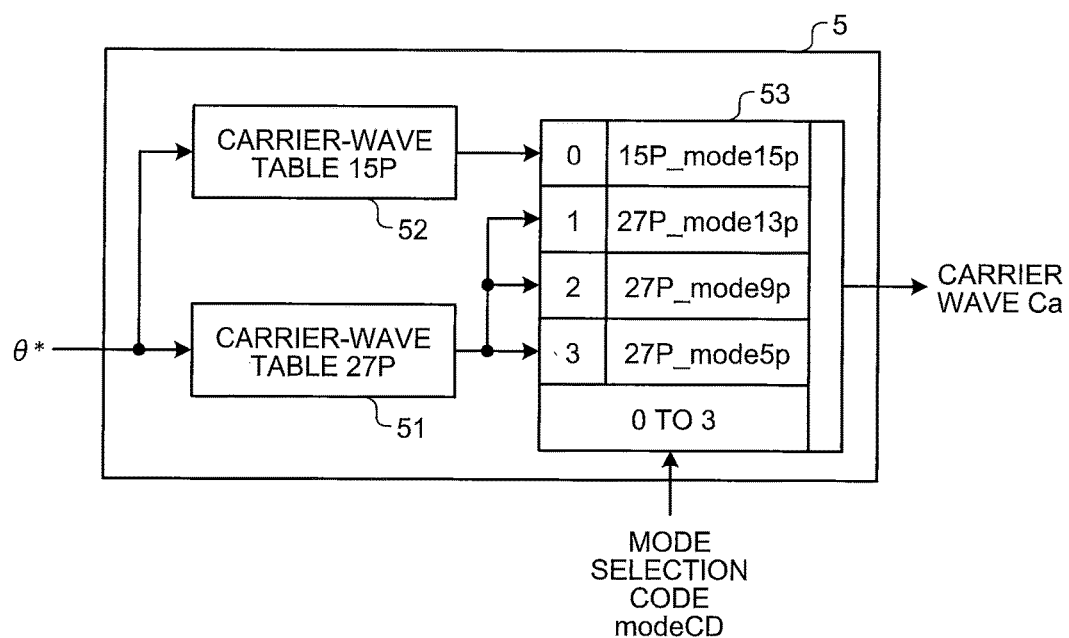
FIG. 12 is a diagram illustrating a configuration example of a carrier-wave generation unit according to the first embodiment.

Next, the carrier-wave generation unit 5 is described in detail with reference to FIG. 12. FIG. 12 is a diagram illustrating a configuration example of the carrier-wave generation unit 5. As illustrated in FIG. 12, the carrier-wave generation unit 5 is configured to include a carrier-wave table 51, a carrier-wave table 52, and a carrier-wave selection unit 53.

The output-voltage phase-angle command θ* is input to the carrier-wave tables 51 and 52. In the carrier-wave table 51, a parameter for generating a first carrier wave, in which the wave number in one cycle of the carrier wave is 27 for example, is stored. In the carrier-wave table 52, a parameter for generating a second carrier wave, in which the wave number in one cycle of the carrier wave is 15 for example, is stored. Owing to this operation, a carrier wave synchronized with the output-voltage phase-angle command θ* is generated. In the present specification, the PWM control is executed with the carrier wave synchronized with the output-voltage phase-angle command θ* as described above, which is referred to as "synchronous PWM mode". In contrast, the PWM control is executed with a carrier wave generated with an arbitrary frequency regardless of the output-voltage phase-angle command θ*, which is referred to as "asynchronous PWM mode". As illustrated in FIG. 12, in the carrier-wave selection unit 53, storage areas are provided in accordance with the mode selection code modeCD. Parameter in accordance with the modulation modes are stored in the corresponding areas. For example, a parameter in the 15-wave non-overmodulation synchronous 15-pulse mode is stored in the area described as "15P_mode15p". For another example, a parameter in the 27-wave overmodulation synchronous 13-pulse mode is stored in the area described as "27P_mode13p". The carrier-wave selection unit 53 uses the input mode selection code modeCD as an index, and uses the parameter stored in the corresponding-index area to generate and output the carrier wave Ca to the comparison unit 7.

The control method described above is referred to below as "narrow-pulse prevention synchronous Nb-pulse overmodulation PWM mode".

Figure 23:
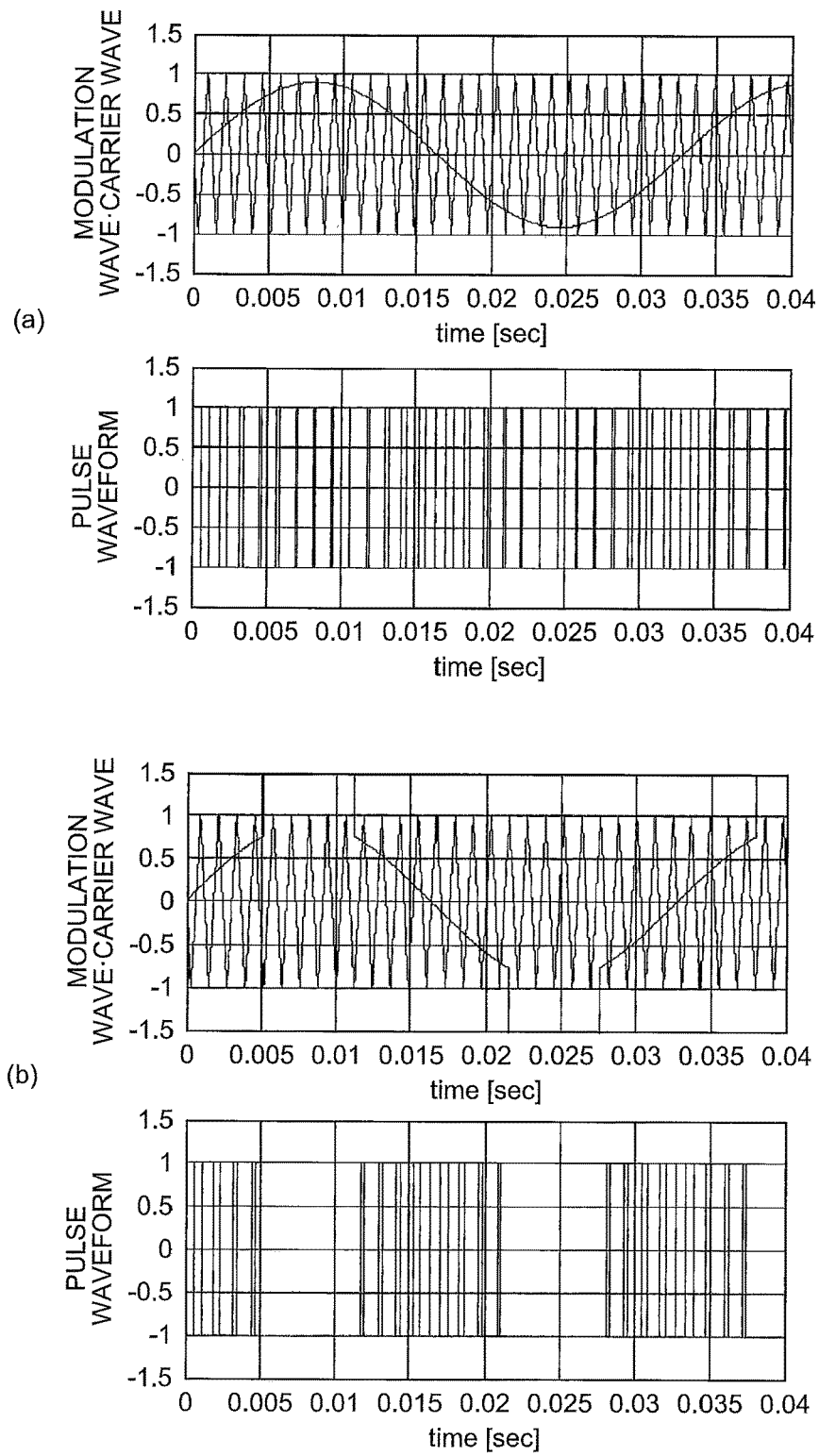
FIG. 23 are diagrams illustrating pulse waveforms in a synchronous multi-pulse mode and an overmodulation mode applied in the power conversion device according to the first embodiment.

Next, there is described the characteristics of the narrow-pulse prevention synchronous Nb-pulse overmodulation PWM mode applied in the present embodiment. FIG. 23(a) is a diagram illustrating a modulation wave and a carrier wave as well as a pulse waveform in the synchronous multi-pulse mode. FIG. 23(b) is a diagram illustrating a modulation wave and a carrier wave as well as a pulse waveform in the narrow-pulse prevention synchronous Nb-pulse overmodulation PWM mode applied in the present embodiment. The respective upper diagrams in FIG. 23(a) and FIG. 23(b) illustrate a modulation wave and a carrier wave, while the respective lower diagrams illustrate a pulse waveform. The modulation factor PMF in FIG. 2 is 0.75. As illustrated in FIG. 23(a), although the modulation factor PMF is 0.75 that is smaller than $\pi/4$, narrow pulses are generated at and around the peak value (the peak value of the modulation wave) in the output voltage. Therefore, generation of such narrow pulses cannot be suppressed in the normal overmodulation mode that is started from the point in time when the modulation factor PMF becomes equal to or greater than $\pi/4$.

In contrast, in the overmodulation mode applied in the present embodiment, the modulation wave is not brought into correspondence with a sine wave in a specific-phase section (also referred to as "first section"), but a signal value that is larger than the value of the carrier wave is normally output as a modulation wave, so as to stop the switching during the specific-phase section, and eliminate the pulses at and around the peak value, which are the cause of generation of the narrow pulses. In FIG. 23(b), with respect to the waveform in the synchronous 27-pulse mode, five pulses corresponding to five cycles of the carrier wave are eliminated in the positive section and the negative section, respectively. As a result, 17 pulses are output. A specific-phase section is provided, during which the switching is stopped independently regardless of the output-voltage command. Therefore, the start of overmodulation mode can be set to an arbitrary time point. From the point in time when the modulation factor is an arbitrary value of less than $\pi/4$, the overmodulation mode is started. Accordingly, even when the modulation factor is less than $\pi/4$, generation of the narrow pulses is still suppressed. Further, the specific-phase section, during which the switching is stopped, is set irregularly depending on the modulation factor. This suppresses generation of the narrow pulses more reliably even in a transient state, in which the output frequency increases, after the start of overmodulation mode.

Furthermore, in the narrow-pulse prevention synchronous Nb-pulse overmodulation PWM mode applied in the present embodiment, as described above, the specific-phase section, during which the switching is stopped, is set such that as the modulation factor increases, the length of the specific-phase section is increased in stages, and also the number of pulses to be eliminated from the number of pulses in the reference synchronous Nb-pulse mode is increased in stages. Therefore, there are a plurality of modulation modes having different specific-phase sections, during which the switching is stopped, for an identical modulation-factor command value PMF.

Figure 13:
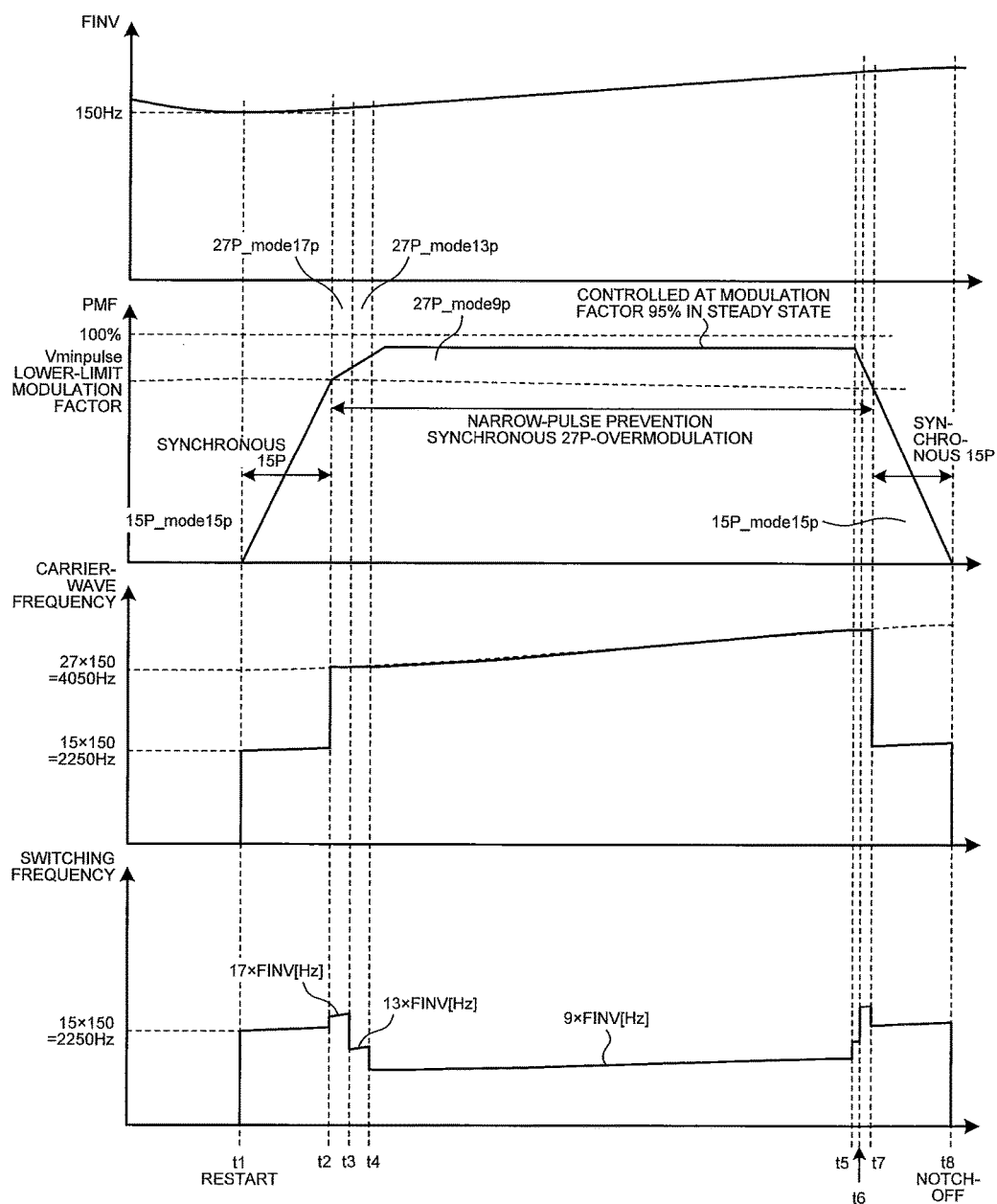
FIG. 13 is an explanatory diagram of an operation example of the power conversion device according to the first embodiment.

Next, there is described an operation example of the power conversion device according to the first embodiment. FIG. 13 is an explanatory diagram of the operation example of the power conversion device according to the first embodiment. FIG. 13 illustrates an example of the operation waveform from the restart to notch-off in a power conversion device for a railway vehicle. In FIG. 13, the horizontal axis represents the time, and the vertical axis represents the output-voltage frequency, the modulation factor, the carrier-wave frequency, and the switching frequency in the described order from the top.

The meaning of the terms "restart" and "notch-off" used in the present specification is clarified. First, "restart" literally means starting the vehicle again. The difference between "restart" and "normal start" is whether or not the vehicle is moving at the time of start. "Normal start" refers to starting the vehicle that is stopped. "Restart" refers to starting the vehicle in a coasting state in which the vehicle is moving. Further, "restart period" is a period from when the power conversion device initiates the restart to when the power conversion device returns to the normal control operation (also referred to as "V (variable)/F (frequency) control" in the case of a railway vehicle).

"Notch-off" means stopping the output in order to bring the vehicle into a coasting state. In the case of stopping the vehicle normally, a brake operation is further required. Furthermore, "notch-off period" is a period from when the power conversion device starts the notch-off to when the vehicle is brought into a completely coasting state (the output voltage=0).

(Operation at the Time of Restart)

Referring back to FIG. 13, there is described the operation of the power conversion device at the time of restart. First, the power conversion device performs the restart at the time t1. The power conversion device performs the restart in the 15-wave non-overmodulation synchronous 15-pulse mode (15P_mode15p). As carrier waves, a first carrier wave whose carrier-wave frequency is 4050 (=27×150) [Hz], and a second carrier wave whose carrier-wave frequency is 2250 (=15×150) [Hz], are prepared. At the time of restart, the second carrier wave whose carrier-wave frequency is 2250 [Hz] is selected as a carrier wave. At this time, the switching frequency is 2250 [Hz]. During the restart period, the carrier-wave frequency and the switching frequency increase gradually from 2250 (=15×150) [Hz]. Also, the output-voltage frequency (FINV) increases gradually from 150 [Hz], and the modulation factor PMF increases from 0 to a lower-limit modulation factor Vminpulse. The control in 15P_mode15p is continued until the time t2.

At the time t2, because the modulation factor PMF reaches the lower-limit modulation factor Vminpulse, the modulation mode is changed to the 27-wave overmodulation synchronous 17-pulse mode (27P_mode17p). In the present embodiment, as illustrated in FIG. 7, the lower-limit modulation factor Vminpulse is set to 70%. At this time, the carrier wave is switched to the first carrier wave whose carrier-wave frequency is 4050 (=27×150) [Hz]. The switching frequency is 17×Finv [Hz].

Thereafter, at the time t3, the modulation mode is changed to the 27-wave overmodulation synchronous 13-pulse mode (27P_mode13p). At the time t4, the modulation mode is changed to the 27-wave overmodulation synchronous 9-pulse mode (27P_mode9p), and then the operation is brought to a steady state. In the steady state, the operation is controlled at the modulation factor of 95%.

(Operation at the Time of Notch-Off)

At the time of notch-off, the power conversion device performs an operation in reverse order of the operation at the time of restart. First, at the time t5, while the modulation mode is changed from the 27-wave overmodulation synchronous 9-pulse mode (27P_mode9p) to the 27-wave overmodulation synchronous 13-pulse mode (27P_mode13p), the modulation factor PMF is decreased. At the time t6, the modulation mode is changed to the 27-wave overmodulation synchronous 17-pulse mode (27P_mode17p). Further, at the time t7, at which the modulation factor PMF reaches the lower-limit modulation factor Vminpulse, the modulation mode is changed to the 15-wave non-overmodulation synchronous 15-pulse mode (15P_mode15p). Thereafter, the modulation factor PMF is decreased. When the output voltage becomes zero, the notch-off operation is finished.

A preferred embodiment of the power conversion device according to the present invention has been described above; however, it is possible to constitute the embodiment while a part of its configuration described above is omitted or modified, or a part of control operations described above can be omitted or modified.

A first scope of the present invention is to generate a first carrier wave, and a second carrier wave with a frequency lower than the first carrier wave, to output the second carrier wave when a modulation factor PMF is lower than a threshold value, and to output the first carrier wave when the modulation factor PMF is equal to or higher than the threshold value. Owing to this operation, it is possible to suppress an unnecessary increase in the switching loss under a condition of a low modulation factor before the modulation mode is switched to the overmodulation mode. It is preferable to use a modulation mode, in which overmodulation is performed, during the period of outputting the first carrier wave. When the modulation mode, in which overmodulation is performed, is used during the period of outputting the first carrier wave, even a power conversion device that does not have a minimum-on function can still suppress generation of narrow pulses. When the present invention is applied to a power conversion device that has the minimum-on function, an effect is also obtained where the power conversion device can suppress an error of the output voltage.

A second scope of the present invention is to perform carrier-wave switching during the restart period when restart is performed, or during the notch-off period when the start has been stopped, in a frequency range higher than the frequency corresponding to the threshold value of the modulation factor PMF.

As described in the Patent Literature 1, at the time of restart, there is a sharp increase in the current caused by the mode switching. Therefore, in the case of selecting the asynchronous PWM mode or the synchronous PWM mode, in order not to switch between the asynchronous PWM mode and the synchronous PWM mode at the restart or notch-off, it is desirable that upon selecting the asynchronous PWM mode, this asynchronous PWM mode is maintained, and upon selecting the synchronous PWM mode, this synchronous PWM mode is maintained. Meanwhile, in the case of appropriately selecting the asynchronous PWM mode or the synchronous PWM mode to perform power conversion, it is considered to prepare a carrier wave for the asynchronous PWM mode, and a carrier wave for the synchronous PWM mode, and to set the optimum frequency for each of the carrier waves. However, at the time of restart, it is desirable for the power conversion to transition between identical modulation modes (either between the synchronous PWM modes or between the asynchronous PWM modes). Therefore, the carrier-wave frequency results in a constant frequency determined by the carrier wave for the asynchronous PWM mode, or the carrier wave for the synchronous PWM mode. Accordingly, in the method to prepare a carrier wave for the asynchronous PWM mode, and a carrier wave for the synchronous PWM mode, and to set the optimum frequency for each of the carrier waves, there is a likelihood of unnecessarily increasing the switching frequency, or generating ripples in the output voltage.

Therefore, as described for the invention having the second scope, it is important to perform the carrier-wave switching during the restart period. By performing the carrier-wave switching during the restart period, an effect is obtained where an unnecessary increase in the switching frequency can be suppressed, and ripples in the output voltage can be reduced.

It is obvious that, aside from the restart or notch-off operation, when the power conversion device operates in accordance with the normal control curve set in advance, the power conversion device uses the second carrier wave until the modulation factor becomes a modulation factor at which the overmodulation mode is started, and uses the first carrier wave with a frequency higher than the second carrier wave after the overmodulation mode is started. This can suppress unnecessary switching loss up until the overmodulation mode is started.

"Restart", "at the time of restart", and "restart period", which are described above, can be read as "notch-off", "at the time of notch-off", and "notch-off period", respectively. That is, if the carrier-wave switching is performed during the notch-off period when the notch-off is performed in the frequency range higher than the frequency corresponding to the threshold value of the modulation factor PMF, then an effect is obtained where an unnecessary increase in the switching frequency can be suppressed, and ripples in the output voltage can be reduced.

A third scope of the present invention is to perform the carrier-wave switching described above in the synchronous PWM mode. In other words, the modulation modes before and after performing the carrier-wave switching are both set to the synchronous PWM mode.

As disclosed in the Patent Literature 1, in the overmodulation mode, low-frequency ripples are likely to be caused by a decrease in the number of pulses. Therefore, it is desirable to set to the synchronous overmodulation PWM mode.

As described for the invention having the third scope, when the carrier-wave switching is performed during the restart period or the notch-off period, the previous and subsequent modulation modes are both set to the synchronous PWM mode. Therefore, an effect is obtained where a sharp increase in the current, and low-frequency ripples, which are caused by the mode switching, can be suppressed.

In the asynchronous PWM mode, it is also possible to obtain the same effects as the synchronous PWM mode by providing a carrier wave Ca1 for the overmodulation mode, and a carrier wave Ca2 for the non-overmodulation mode, where "Ca1-frequency">"Ca2-frequency", so as to perform the mode switching in the manner as described above. However, in order to suppress low-frequency ripples, it is necessary to set the carrier-wave frequency to a higher frequency as compared to the first embodiment that employs the synchronous PWM mode.

The overmodulation mode described in the present specification is a modulation mode in which the switching is stopped during a period longer than one cycle of the carrier wave, which is determined by the carrier-wave frequency, in the period including the timing at which the AC output voltage becomes the maximum value or the minimum value. Various methods are considered other than the method described in the present embodiment. For example, as the normal overmodulation mode as described in Japanese Patent Application Laid-open Publication No. H07-227085, the method has been commonly known as increasing the maximum amplitude of a modulation wave gradually in accordance with an output-voltage command, and starting the overmodulation mode from the point in time when the maximum value of the modulation wave becomes larger than the maximum value of the carrier wave. It is also possible to apply this overmodulation mode instead of the overmodulation mode described in the present embodiment.

However, the normal overmodulation mode as described above is started from the point in time when the maximum value of the modulation wave becomes larger than the maximum value of the carrier wave. Therefore, the overmodulation mode cannot be started at the point in time when the modulation factor is lower than $\pi/4$ at which the maximum value of the carrier wave corresponds with the maximum value of the modulation wave ($\pi/\sqrt{(12)}$ when a third-order harmonic is superimposed on the modulation wave as described later in a third embodiment). Accordingly, it is necessary to apply the method described in the present embodiment in the case of applying the overmodulation mode from the point in time when the modulation factor is less than $\pi/4$ ($\pi/\sqrt{(12)}$ when a third-order harmonic is superimposed on the modulation wave as described later in the third embodiment).

Second Embodiment

Figure 14:
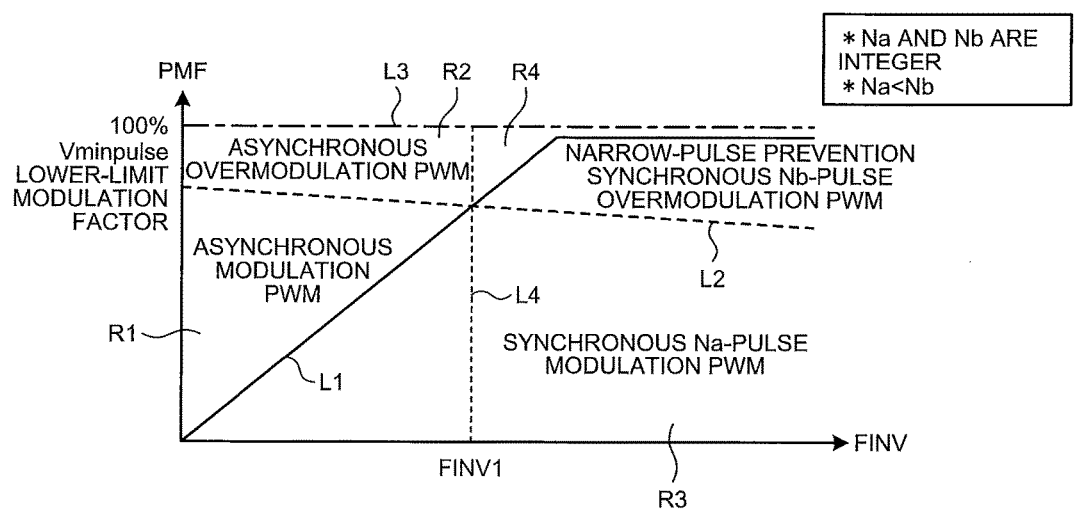
FIG. 14 is an explanatory diagram of a modulation-mode transition condition in a power conversion device according to a second embodiment.

FIG. 14 is an explanatory diagram of the modulation-mode transition condition in a power conversion device according to a second embodiment. FIG. 14 is a graph illustrating the relation between an output frequency FINV of AC power and the modulation factor PMF. The AC power is output to the AC load 1 by the power conversion unit 2. The modulation factor PMF is determined by the output voltage output to the AC load 1 and by the voltage EFC of DC power supplied from the DC power supply 3. In FIG. 14, L1 illustrated by the bold solid line shows a typical control curve to control the power conversion device. L2 illustrated by the bold dotted line shows the lower-limit modulation factor. L3 illustrated by the dot-and-dash line shows a control curve in the synchronous 1-pulse mode (1P). L1, L2, and L3 are all expressed as a function of the output-voltage frequency FINV. The straight line L2 is a boundary line of whether or not over modulation is performed. When the coordinate on the horizontal axis at the intersection of L1 and L2 is represented as Finv1, and the straight line drawn from Finv1 parallel to the vertical axis is represented as L4, then the straight line L4 serves as a boundary line that divides synchronization and non-synchronization. The modulation mode in the power conversion device according to the second embodiment can be divided into four regions by these straight lines L2, L3, and L4, the horizontal axis, and the vertical axis, as illustrated in FIG. 14.

(2.1) Asynchronous modulation PWM region (region R1)

A region surrounded by the horizontal axis, the vertical axis, L1, and L2, where the PWM control is executed using an asynchronous carrier wave.

(2.2) Asynchronous overmodulation PWM region (region R2) A region surrounded by the vertical axis, L2, L3, and L4, where the PWM control is executed using an asynchronous carrier wave.

(2.3) Synchronous Na-pulse modulation PWM region (region R3)
A region surrounded by the horizontal axis, L2, and L4, where the PWM control is executed using a synchronous carrier wave.

(2.4) Narrow-pulse prevention synchronous Nb-pulse overmodulation PWM region (region R4: Nb>Na) A region surrounded by L2, L3, and L4, where the overmodulation PWM control is executed using the synchronous carrier wave described in the first embodiment described above.

In the first embodiment described above, the configuration of the region R3 and the region R4 in FIG. 14 has been described. The control curve of the normal control operation described in the first embodiment corresponds to the L1 curve in FIG. 14.

In a typical power conversion device, as the output frequency FINV increases, the power conversion unit 2 performs power conversion by the control method so called "variable voltage variable frequency (VVVF) control" up until the modulation factor PMF reaches 100% that is the limit of the output voltage. The power conversion unit 2 outputs AC power in such a manner that the output frequency FINV, and the output voltage (or the modulation factor PMF) increase while maintaining the constant ratio between them. In contrast, after the modulation factor PMF reaches 100% that is a limit value, power conversion is performed by the control method so called "constant voltage variable frequency (CVVF) control". The power conversion unit 2 outputs AC power in such a manner that the output frequency increases while the output voltage remains to be constant.

The state in which the modulation factor PMF is 100% is defined as a modulation factor in the 1-pulse mode (180° energization or rectangular-wave driving) that is commonly known in this technical field. The mode, in which the CVVF control is executed in a state of the modulation factor of 100%, is described above. However, the control method is not limited thereto. It is also possible to execute the CVVF control at an arbitrary modulation factor PMF, or execute the VVVF control in all the regions. In FIG. 14, an example is illustrated in which the CVVF control is executed when the modulation factor is near 95% immediately before reaching 100%.

In the case of controlling the power conversion device based on the control curve L1, the modulation mode transitions from the region R1 to the region R4. The second embodiment is different from the first embodiment in that the modulation mode in the region R1 is not the synchronous PWM mode, but is the asynchronous PWM mode. In this control, because the modulation mode transitions from the region R1 to the region R4 at the intersection of L1 and L2, the power conversion device can perform the switching control in such a manner as to suppress generation of the narrow pulses. Therefore, the power conversion device is capable of suppressing oscillations in the output voltage, which are ascribed to the narrow pulses.

In the case where the power conversion device is controlled by a control curve with a gradient greater than the control curve L1, the modulation mode transitions from the region R1 to the region R4 in the order described as "region R1→region R2→region R4". In this case, first in the mode transition from the region R1 to the region R2, when the modulation factor PMF exceeds L2, the normal modulation is switched to overmodulation. Therefore, the power conversion device can perform the switching control in such a manner as to suppress generation of the narrow pulses, while maintaining the asynchronous PWM mode. This makes it possible for the mode transition to smoothly occur. Further, in the mode transition from the region R2 to the region R4, upon exceeding L4, the asynchronous PWM mode is switched to the synchronous PWM mode. Therefore, the power conversion device can perform the switching control, while maintaining the overmodulation state. This makes it possible for the mode transition to smoothly occur.

In contrast to the above, in the case where the power conversion device is controlled by a control curve with a gradient smaller than the control curve L1, the modulation mode transitions from the region R1 to the region R4 in the order described as "region R1→region R3→region R4". In this case, first, in the mode transition from the region R1 to the region R3, upon exceeding L4, the asynchronous PWM mode is switched to the synchronous PWM mode. Therefore, the power conversion device can perform the switching control, while maintaining the normal modulation state. This makes it possible for the mode transition to smoothly occur. Further, in the mode transition from the region R3 to the region R4, upon exceeding L2, the normal modulation is switched to overmodulation. Therefore, the power conversion device can perform the switching control in such a manner as to suppress generation of the narrow pulses, while maintaining the synchronous PWM mode. This makes it possible for the mode transition to smoothly occur.

A reason why the gradient of L1 is changed as described above is ascribed to significant variations in the overhead-wire voltage of DC power in a power conversion device for a railway vehicle. Generally, in the electric railway infrastructure with the 1500-V DC overhead wire, the overhead-wire voltage varies within the range between approximately 1000 V and 2000 V due to various factors. Because of this operation, for example, assuming that the control curve L1 in FIG. 14 is a control curve for the case where the DC voltage EFC=1500 V, when the overhead-wire voltage is decreased to 1000 V, the DC voltage EFC is also decreased. Therefore, the power conversion device is controlled by a control curve with a gradient greater than the control curve L1. In contrast, when the overhead-wire voltage is increased to 2000 V, the DC voltage EFC is also increased. Therefore, the power conversion device is controlled by a control curve with a gradient smaller than the control curve L1.

In the above explanations, L4 that serves as the boundary line for dividing synchronization and non-synchronization is described as being fixed. However, L4 is not limited thereto, and it is also possible that the value of FINV1 is variable in accordance with the gradient of the control curve L1. Further, the control in the region R2 described above may be executed in the narrow-pulse prevention synchronous Nb-pulse overmodulation PWM mode that is the same as in the region R4. Owing to this control, it is possible to avoid the possibility for low-frequency ripples to be generated by a decrease in the number of pulses in the asynchronous overmodulation mode, as disclosed in Patent Literature 1.

Third Embodiment

Next, a power conversion device according to a third embodiment is described. In the power conversion device according to the third embodiment, a third-order harmonic of the fundamental wave is superimposed on a modulation wave.

Figure 15:
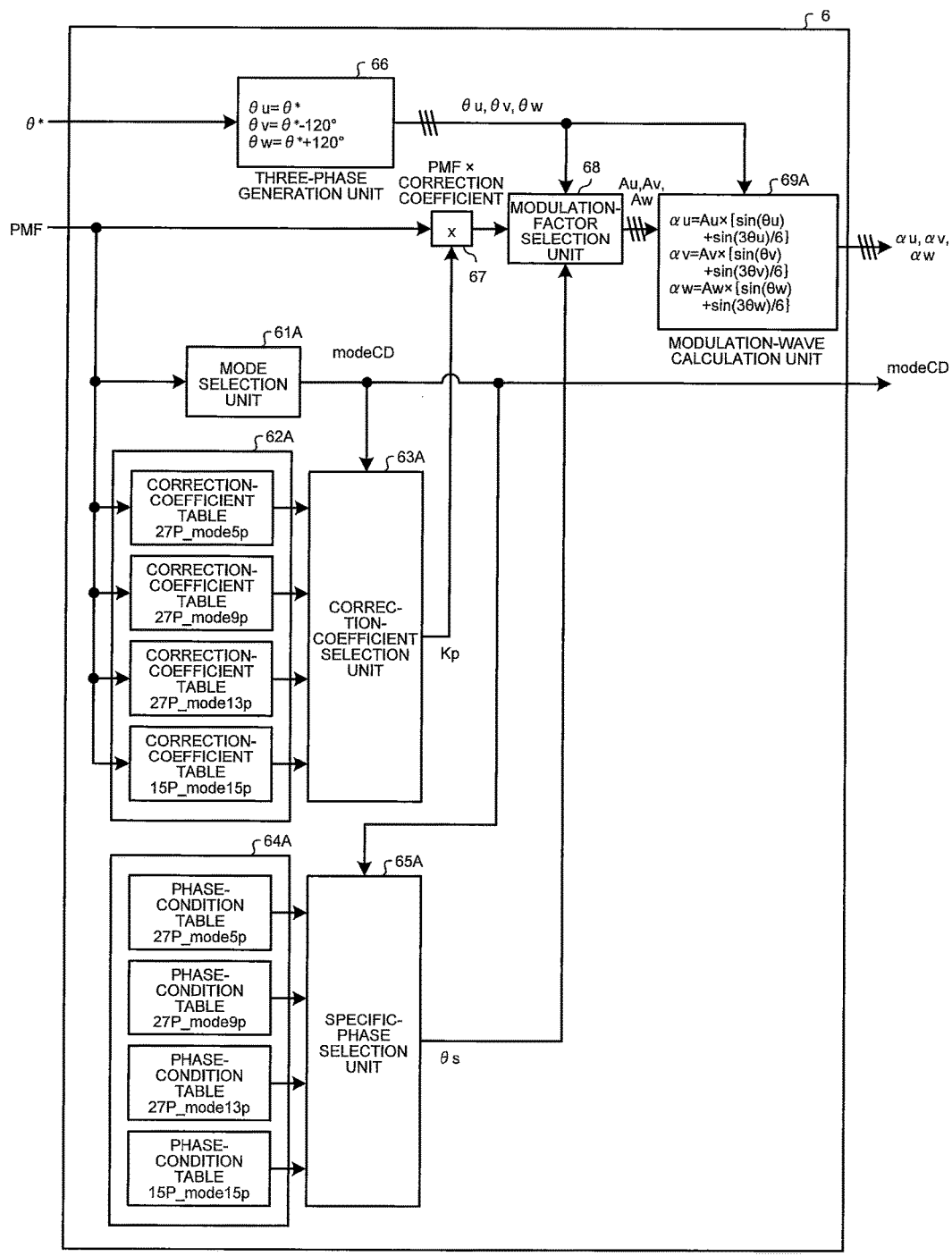
FIG. 15 is a diagram illustrating a configuration example of a modulation-wave generation unit according to a third embodiment.

FIG. 15 is a diagram illustrating a configuration example of the modulation-wave generation unit 6 according to the third embodiment. Different points from the modulation-wave generation unit 6 according to the first embodiment illustrated in FIG. 3 are the configurations or functions of a mode selection unit 61A, a correction-coefficient table group 62A, a correction-coefficient selection unit 63A, a phase-condition table group 64A, a specific-phase selection unit 65A, and a modulation-wave calculation unit 69A. Other constituent elements of the third embodiment are identical or equivalent to those of the first embodiment, and constituent elements in common to the first and third embodiments are denoted by like reference signs and redundant descriptions thereof will be omitted.

The correction-coefficient table group 62A is provided with correction-coefficient tables for the respective modulation modes and modulation factors PMF. In FIG. 3, the 27-wave overmodulation synchronous 9-pulse mode (27P_mode9p), the 27-wave overmodulation synchronous 13-pulse mode (27P_mode13p), the 27-wave overmodulation synchronous 17-pulse mode (27P_mode17p), and the 15-wave non-overmodulation synchronous 15-pulse mode (15P_mode15p), are illustrated as examples. In FIG. 15, the 27-wave overmodulation synchronous 5-pulse mode (27P_mode5p), the 27-wave overmodulation synchronous 9-pulse mode (27P_mode9p), the 27-wave overmodulation synchronous 13-pulse mode (27P_mode13p), and the 15-wave non-overmodulation synchronous 15-pulse mode (15P_mode15p), are illustrated as an example. That is, in the correction-coefficient table group 62A according to the third embodiment, the number of output pulses in each modulation mode is reduced from the number of output pulses in the first embodiment. The reasons for this are described later.

In the same manner as the first embodiment, the modulation factor PMF is input to the correction-coefficient table group 62A. The correction coefficient in accordance with the modulation factor PMF, that is, a candidate value for the correction coefficient is selected from each correction-coefficient table, and then input to the correction-coefficient selection unit 63A.

In the phase-condition table group 64A, the specific phase θs is stored to each modulation mode corresponding to the correction-coefficient table in the correction-coefficient table group 62A. The specific phase θs is as defined by the above equation (4).

In the same manner as the first embodiment, candidate values of the specific phases θs stored in the phase-condition table group 64A are input to the specific-phase selection unit 65A, and then a specific phase θs corresponding to the mode selection code modeCD is selected from among the input candidate values for the specific phases θs by the specific-phase selection unit 65A, and is output to the modulation-factor selection unit 68.

The modulation-wave phase angles θu, θv, and θw generated by the three-phase generation unit 66, and the narrow-pulse prevention modulation factors Au, Av, and Aw generated by the modulation-factor selection unit 68, are input to the modulation-wave calculation unit 69A. By using the modulation-wave phase angles θu, θv, and θw, and the narrow-pulse prevention modulation factors Au, Av, and Aw, the modulation-wave calculation unit 69A generates modulation waves αu, αv, and αw, on which a third-order harmonic component of the fundamental wave is superimposed (hereinafter, referred to as "third-order superimposed modulation wave" as needed) according to the following equation.

$$\alpha u = Au \times \{\sin(\theta u) + (1/6) \times \sin(3\theta u)\}$$

$$\alpha v = Av \times \{\sin(\theta v) + (1/6) \times \sin(3\theta v)\}$$

$$\alpha w = Aw \times \{\sin(\theta w) + (1/6) \times \sin(3\theta w)\} \quad (8)$$

Figure 16:
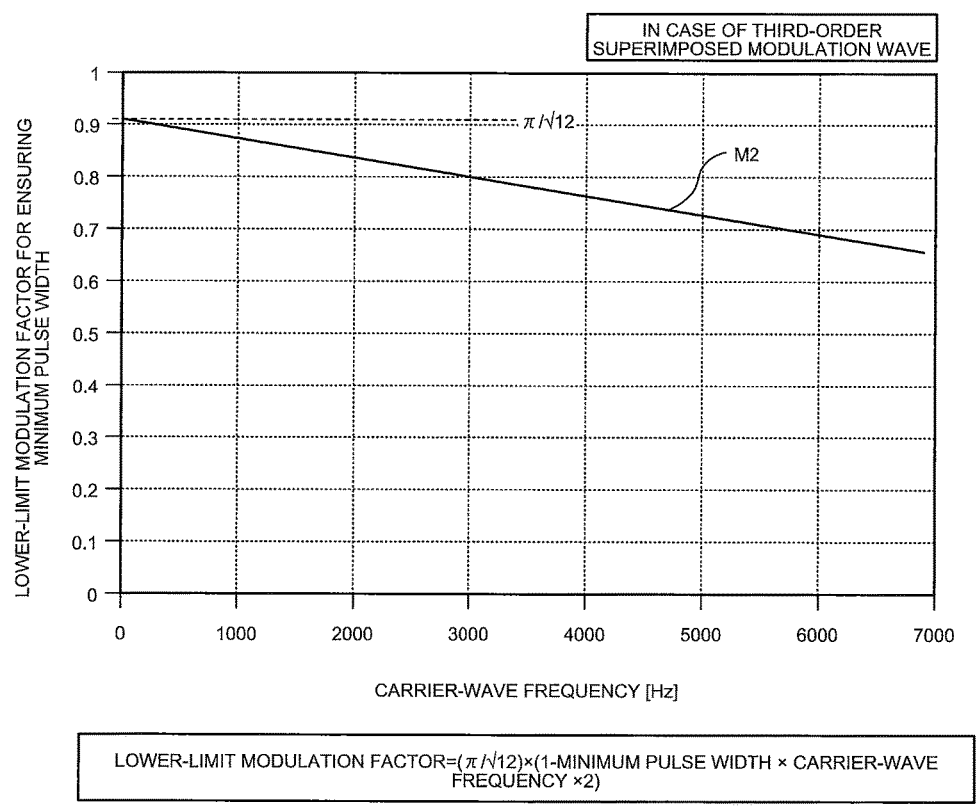
FIG. 16 is a diagram illustrating a lower-limit modulation factor for ensuring a minimum pulse width in a case of a third-order superimposed modulation wave.

FIG. 16 is a diagram illustrating the lower-limit modulation factor for ensuring a minimum pulse width, where this minimum pulse width is 20 [μsec], in the case of a third-order superimposed modulation wave. In FIG. 16, the horizontal axis represents the carrier-wave frequency, and the vertical axis represents the lower-limit modulation factor. A boundary line M2 illustrated by the solid line shows the lower-limit modulation factor that changes in accordance with the carrier-wave frequency. As it is clear from FIG. 6 that the lower-limit modulation factor is different from the case where a third-order harmonic is not superimposed on a modulation wave. In the case of a third-order superimposed modulation wave, the lower-limit modulation factor is a function of "minimum pulse width" and "carrier-wave frequency", and can be expressed as the following equation.

$$\text{Lower-limit modulation factor} = (\pi/\sqrt{(12)}) \times (1 - \text{minimum pulse width} \times \text{carrier-wave frequency} \times 2) \quad (9)$$

It can be understood from FIG. 16 that the entire waveform of the lower-limit modulation factor shifts upward as compared to FIG. 6, and it is sufficient that the value of the lower-limit modulation factor for ensuring the minimum pulse width is larger than the case where a third-order harmonic is not imposed on a modulation wave. Similarly to the first embodiment, the lower-limit modulation factor for ensuring the minimum pulse width does not need to be the point on the boundary line M2. When a value that does not exceed the value on the boundary line M2 is selected, then a switching signal can be generated to have a pulse width greater than the minimum pulse width.

Figure 17:
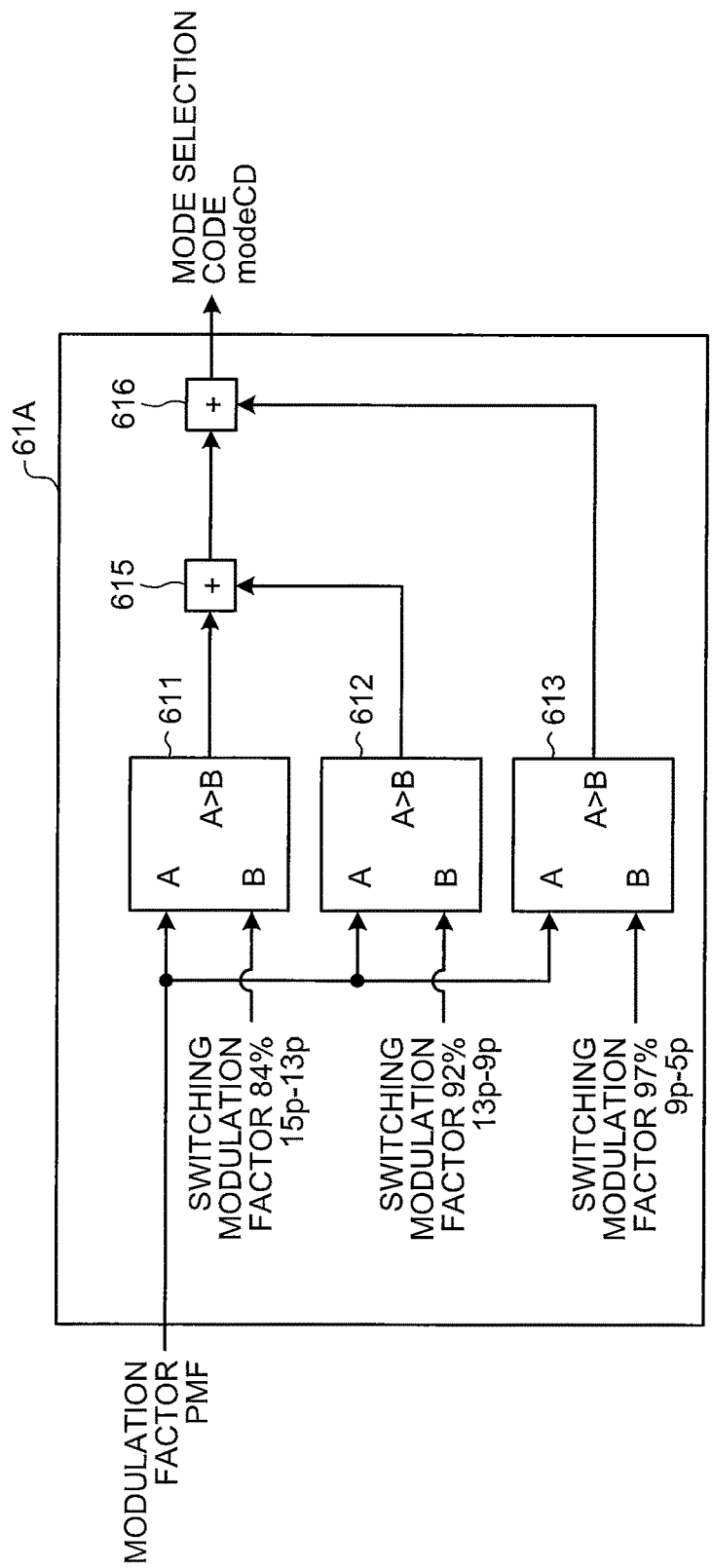
FIG. 17 is a diagram illustrating a configuration example of a mode selection unit according to the third embodiment.

Next, the operation of the mode selection unit 61A is described. FIG. 17 is a diagram illustrating a configuration example of the mode selection unit 61A illustrated in FIG. 15. While the configuration of the mode selection unit 61A is the same as or equivalent to the configuration of the mode selection unit 61 illustrated in FIG. 7, different information is input to each B-terminal of three comparison determination devices 611 to 613.

For example, the value "84%", that is, "0.84" is input to the B-terminal of the comparison determination device 611. In the third embodiment, this value "84%" is a modulation factor when the modulation mode is switched from "15-wave non-overmodulation synchronous 15-pulse mode" to "27-wave overmodulation synchronous 13-pulse mode". In the first embodiment, the value "70%" is input to the B-terminal of the comparison determination device 611, and the modulation mode is switched to the "27-wave overmodulation synchronous 17-pulse mode". In contrast, in the third embodiment, the value "84%" is input to the B-terminal, and the modulation mode is switched to the "27-wave overmodulation synchronous 13-pulse mode" in which the number of pulses is smaller than that of the first embodiment. When a third-order harmonic is superimposed on a modulation wave, the value of the lower-limit modulation factor shifts upward as illustrated in FIG. 16, and therefore can be set to a value larger than that of the first embodiment. Because the lower-limit modulation factor can be set to have a larger value, it is possible in the modulation-mode switching to skip "27-wave overmodulation synchronous 17-pulse mode", and start from "27-wave overmodulation synchronous 13-pulse mode".

The switching modulation factor 92% is input to the B-terminal of the comparison determination device 612 when the modulation mode is switched from "17-wave overmodulation synchronous 13-pulse mode" to "17-wave overmodulation synchronous 9-pulse mode". The switching modulation factor 97% is input to the B-terminal of the comparison determination device 613 when the modulation mode is switched from "17-wave overmodulation synchronous 9-pulse mode" to "17-wave overmodulation synchronous 5-pulse mode".

The comparison determination devices 611 to 613 output "1" when A≤B is satisfied, and output "0" when A>B is not satisfied, that is, A≤B is satisfied. The adder 615 adds the output from the comparison determination device 612 to the output from the comparison determination device 611. The adder 616 adds the output from the comparison determination device 613 to the output from the adder 615. The output from the adder 616 is output as the mode selection code modeCD. The operation of the mode selection unit 61A described above is summarized as follows.

(3.1) Modulation mode: 15-wave non-overmodulation synchronous 15-pulse mode
   Modulation factor: 84% or lower
   Mode selection code modeCD=0
(3.2) Modulation mode: 27-wave overmodulation synchronous 13-pulse mode
   Modulation factor: Higher than 84%, and 92% or lower
   Mode selection code modeCD=1
(3.3) Modulation mode: 27-wave overmodulation synchronous 9-pulse mode
   Modulation factor: Higher than 92%, and 97% or lower
   Mode selection code modeCD=2
(3.4) Modulation mode: 27-wave overmodulation synchronous 5-pulse mode
   Modulation factor: Higher than 97%
   Mode selection code modeCD=3

Figure 18:
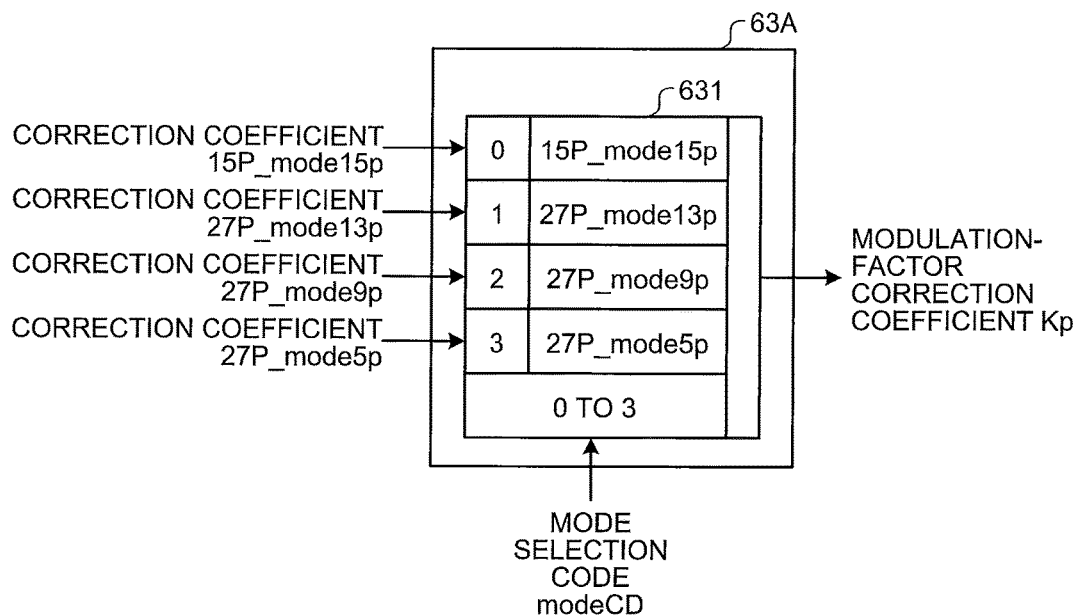
FIG. 18 is a diagram illustrating a configuration example of a correction-coefficient selection unit according to the third embodiment.

FIG. 18 is a diagram illustrating a configuration example of the correction-coefficient selection unit 63A illustrated in FIG. 15. The correction-coefficient selection unit 63A is configured to include the modulation-factor correction-coefficient storage unit 631. Correction coefficients that are set in advance in accordance with the modulation mode are input to the correction-coefficient selection unit 63A. As illustrated in FIG. 18, in the modulation-factor correction-coefficient storage unit 631, storing areas are provided in accordance with the mode selection code modeCD. Correction coefficients in accordance with the modulation mode are stored in the corresponding areas. For example, a correction coefficient in the 15-wave non-overmodulation synchronous 15-pulse mode is stored in the area described as "15P_mode15p". For another example, a correction coefficient in the 27-wave overmodulation synchronous 13-pulse mode is stored in the area described as "27P_mode13p". By using the input mode selection code modeCD as an index, the correction-coefficient selection unit 63A outputs the correction coefficient stored in the corresponding index area as the modulation-factor correction coefficient Kp.

Figure 19:
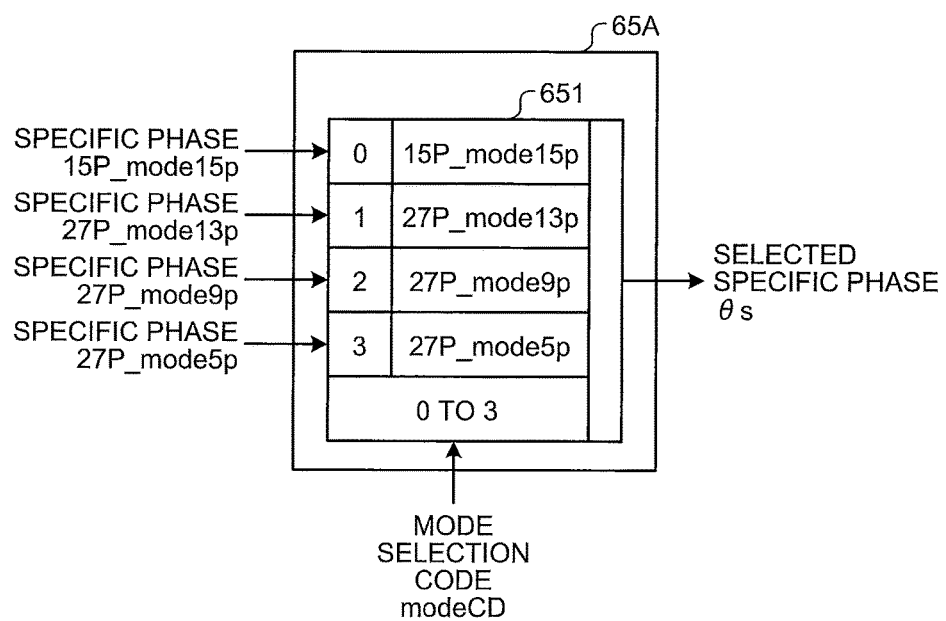
FIG. 19 is a diagram illustrating a configuration example of a specific-phase selection unit according to the third embodiment.

FIG. 19 is a diagram illustrating a configuration example of the specific-phase selection unit 65A illustrated in FIG. 15. The specific-phase selection unit 65A is configured to include the specific-phase storage unit 651. Specific phases that are set in advance in accordance with the modulation mode are input to the specific-phase selection unit 65A. As illustrated in FIG. 19, in the specific-phase storage unit 651, storing areas are provided in accordance with the mode selection code modeCD. Specific phases in accordance with the modulation mode are stored in the corresponding areas. For example, a specific-phase in the 15-wave non-overmodulation synchronous 15-pulse mode is stored in the area described as "15P_mode15p", and for another example, a specific-phase in the 27-wave overmodulation synchronous 13-pulse mode is stored in the area described as "27P_mode13p". The mode selection code modeCD is input to the specific-phase selection unit 65A. The area is designated by the mode selection code modeCD as an index, and the specific phase θs stored in the corresponding area is selected and output.

Figure 20:
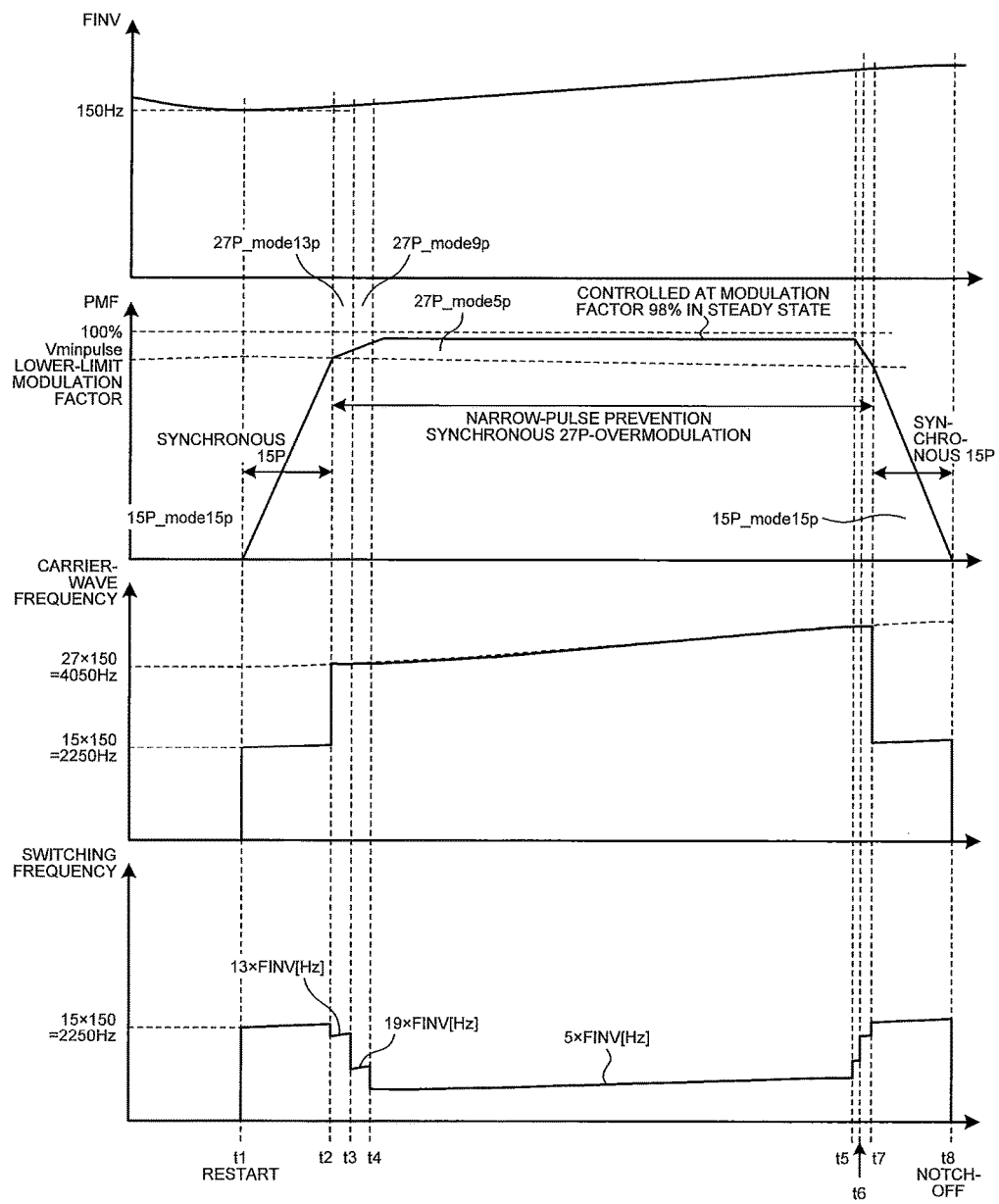
FIG. 20 is an explanatory diagram of an operation example of a power conversion device according to the third embodiment.

FIG. 20 is an explanatory diagram of an operation example of the power conversion device according to the third embodiment. In the same manner as FIG. 13, FIG. 20 illustrates an example of the operation waveform from the restart to notch-off in a power conversion device for a railway vehicle in the order described as "output-voltage frequency", "modulation factor", "carrier-wave frequency", and "switching frequency", from the top of the diagram.

(Operation at the Time of Restart)

First, the power conversion device performs the restart at the time t1. The power conversion device performs the restart in the 15-wave non-overmodulation synchronous 15-pulse mode (15P_mode15p). In the same manner as in the first embodiment, a first carrier wave whose carrier-wave frequency is 4050 (=27×150) [Hz], and a second carrier wave whose carrier-wave frequency is 2250 (=15×150) [Hz], are prepared. At the time of restart, the second carrier wave whose carrier-wave frequency is 2250 [Hz] is selected as a carrier wave. At this time, the switching frequency is 2250 [Hz]. During the restart period, the carrier-wave frequency and the switching frequency increase gradually from 2250 (=15×150) [Hz]. Also, the output-voltage frequency (FINV) increases gradually from 150 [Hz], and the modulation factor PMF increases from 0 to the lower-limit modulation factor Vminpulse. The control in 15P_mode15p is continued until the time t2.

At the time t2, because the modulation factor PMF reaches the lower-limit modulation factor Vminpulse, the modulation mode is changed to the 27-wave overmodulation synchronous 13-pulse mode (27P_mode13p). In the present embodiment, as illustrated in FIG. 17, the lower-limit modulation factor Vminpulse is set to 84%. At this time, the carrier wave is switched to the first carrier wave with a carrier-wave frequency of 4050 (=27×150) [Hz]. The switching frequency is 13λFinv [Hz], and is lower than the switching frequency in the first embodiment.

Thereafter, at the time t3, the modulation mode is changed to the 27-wave overmodulation synchronous 9-pulse mode (27P_mode9p). At the time t4, the modulation mode is changed to the 27-wave overmodulation synchronous 5-pulse mode (27P_mode5p), and then the operation is brought to a steady state. In the steady state, the operation is controlled at the modulation factor of 98%.

(Operation at the Time of Notch-Off)

At the time of notch-off, the power conversion device performs an operation in reverse order of the operation at the time of restart. First, at the time t5, while the modulation mode is changed from the 27-wave overmodulation synchronous 5-pulse mode (27P_mode5p) to the 27-wave overmodulation synchronous 9-pulse mode (27P_mode9p), the modulation factor PMF is decreased. At the time t6, the modulation mode is changed to the 27-wave overmodulation synchronous 13-pulse mode (27P_mode13p). Further, at the time t7, at which the modulation factor PMF reaches the lower-limit modulation factor Vminpulse, the modulation mode is changed to the 15-wave non-overmodulation synchronous 15-pulse mode (15P_mode15p). Thereafter, the modulation factor PMF is decreased. When the output voltage becomes zero, the notch-off operation is finished.

The power conversion device according to the third embodiment uses a third-order superimposed modulation wave, in which a third-order harmonic is superimposed on a modulation wave, to perform the carrier-wave switching during the restart period or the notch-off period. Therefore, an effect is obtained where an unnecessary increase in the switching frequency can be suppressed, and ripples in the output voltage can be reduced.

The power conversion device according to the third embodiment can also shift from the normal modulation mode to the overmodulation mode at the value of the modulation factor PMF higher than that in the first embodiment. This means that a period of the normal-modulation-mode is longer in the restart period or the notch-off period. Owing to this operation, an output current with a smaller amount of distortion as compared to the first embodiment can be output to the AC load 1. This contributes to a reduction in the harmonic loss in the AC load 1. Further, the power conversion device according to the third embodiment can shift to the modulation mode with a smaller number of pulses more quickly than the first embodiment, and is therefore capable of reducing the switching loss in the power conversion unit 2 more effectively. Accordingly, an effect is obtained where the entire loss in the power conversion device can be reduced.

As described above, the third-order superimposing control can improve the maximum output voltage at the modulation factor $\pi/4$ to the maximum output voltage at the modulation factor $\pi/\sqrt{(12)}$. In the overmodulation mode, the voltage at the modulation factor equal to or greater than $\pi/4$ can be output without applying the third-order superimposing control. Therefore, it is sufficient that the third-order superimposing control is not applied in the overmodulation mode.

The modulation-wave calculation method in the third-order superimposing control is not limited to the above computing equation (8) in which a third-order harmonic is superimposed on a modulation wave. In a three-phase power conversion device, when a harmonic is not included in the line-to-line voltage that is output from the power conversion unit, a harmonic may be included in the output voltage to each phase. Because the waveform of a modulation wave has flexibility, it is possible to use a modulation wave on which a third-order harmonic component of the fundamental wave is superimposed as described above, or to use a modulation wave on which plural 3n-th-order harmonic components of the fundamental wave are superimposed. Furthermore, a harmonic to be superimposed is not limited to a sine wave. For example, it is also possible to use a triangular wave.

Fourth Embodiment

Figure 24:
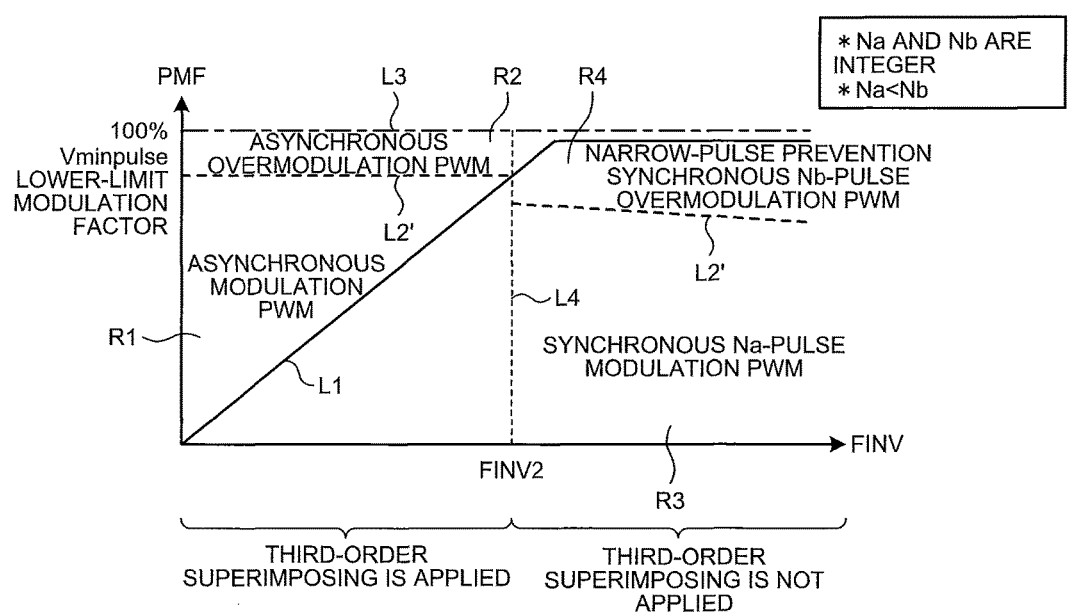
FIG. 24 is an explanatory diagram of a modulation-mode transition condition in the power conversion device according to the fourth embodiment.

Next, a power conversion device according to a fourth embodiment is described. FIG. 24 is an explanatory diagram of the modulation-mode transition condition in the power conversion device according to the fourth embodiment. The power conversion device according to the fourth embodiment is a modification of the second embodiment, in which third-order superimposing to superimpose a third-order harmonic of the fundamental wave on a modulation wave is performed in the region R1 and the region R2 in FIG. 24 that are asynchronous modulation regions.

In the case of controlling the power conversion device based on the control curve L1, the modulation mode transitions from the region R1 to the region R4. The third embodiment is different from the second embodiment in that the modulation mode in the region R1 is an asynchronous PWM mode in which a third-order harmonic of the fundamental wave is superimposed on a modulation wave. In this control, the modulation mode transitions from the region R1 to the region R4 at the intersection of L1 and L2. Owing to the third-order superimposing, the switching frequency increases from FINV in FIG. 14 in the second embodiment to FINV2. As described above, the lower-limit modulation factor also increases from L2 in FIG. 14 to L2' in FIG. 24. This can enlarge the region in the asynchronous PWM mode. In the asynchronous PWM mode, it is possible to execute a highly-responsive current control. This can greatly contribute to improvement in the control response. Further, the power conversion device can execute the switching control in such a manner as to suppress generation of narrow pulses, and is therefore capable of suppressing oscillations in the output voltage caused by the narrow pulses. The modulation modes as illustrated in FIG. 24 are set to the respective regions. Therefore, an effect is obtained where even at the time of restart as described in the first and third embodiments, an unnecessary increase in the switching frequency can still be suppressed, and where ripples in the output voltage can be reduced.

As described above, the third-order superimposing control can improve the maximum output voltage at the modulation factor $\pi/4$ to the maximum output voltage at the modulation factor $\pi/\sqrt{(12)}$. In the overmodulation mode, the voltage at the modulation factor equal to or greater than $\pi/4$ can be output without applying the third-order superimposing control. Therefore, it is sufficient that the third-order superimposing control is not applied in the overmodulation mode as illustrated in FIG. 24. This control can prevent generation of a modulation wave in the overmodulation mode from being unnecessarily complicated.

Fifth Embodiment

Next, a power conversion device according to a fifth embodiment is described. The power conversion device according to the fifth embodiment fixes the number of pulses in one cycle of the carrier wave to nine in any modulation mode.

The constituent elements of the power conversion device according to the fifth embodiment are identical or equivalent to those of the first embodiment, and constituent elements in common to the first and fifth embodiment are denoted by like reference signs and redundant descriptions thereof will be omitted.

In the fifth embodiment, as an example, the number of pulses in one cycle of the carrier wave is fixed to nine by setting the mode selection code modeCD in the mode selection unit 61 as follows.

(4.1) Modulation mode: 9-wave non-overmodulation synchronous 9-pulse mode
 Modulation factor: 73% or lower
 Mode selection code modeCD=0
(4.2) Modulation mode: 15-wave overmodulation synchronous 9-pulse mode
 Modulation factor: Higher than 73%, and 85% or lower
 Mode selection code modeCD=1
(4.3) Modulation mode: 21-wave overmodulation synchronous 9-pulse mode
 Modulation factor: Higher than 85%, and 90% or lower
 Mode selection code modeCD=2
(4.4) Modulation mode: 27-wave overmodulation synchronous 9-pulse mode
 Modulation factor: Higher than 90%
 Mode selection code modeCD=3

A value corresponding to each of the above mode selection codes is stored in the correction-coefficient table group 62 and the phase-condition table group 64. Further, the carrier-wave generation unit 5 is configured to provide a carrier-wave table such that a carrier wave corresponding to each of the above mode selection codes is generated.

Figure 21:
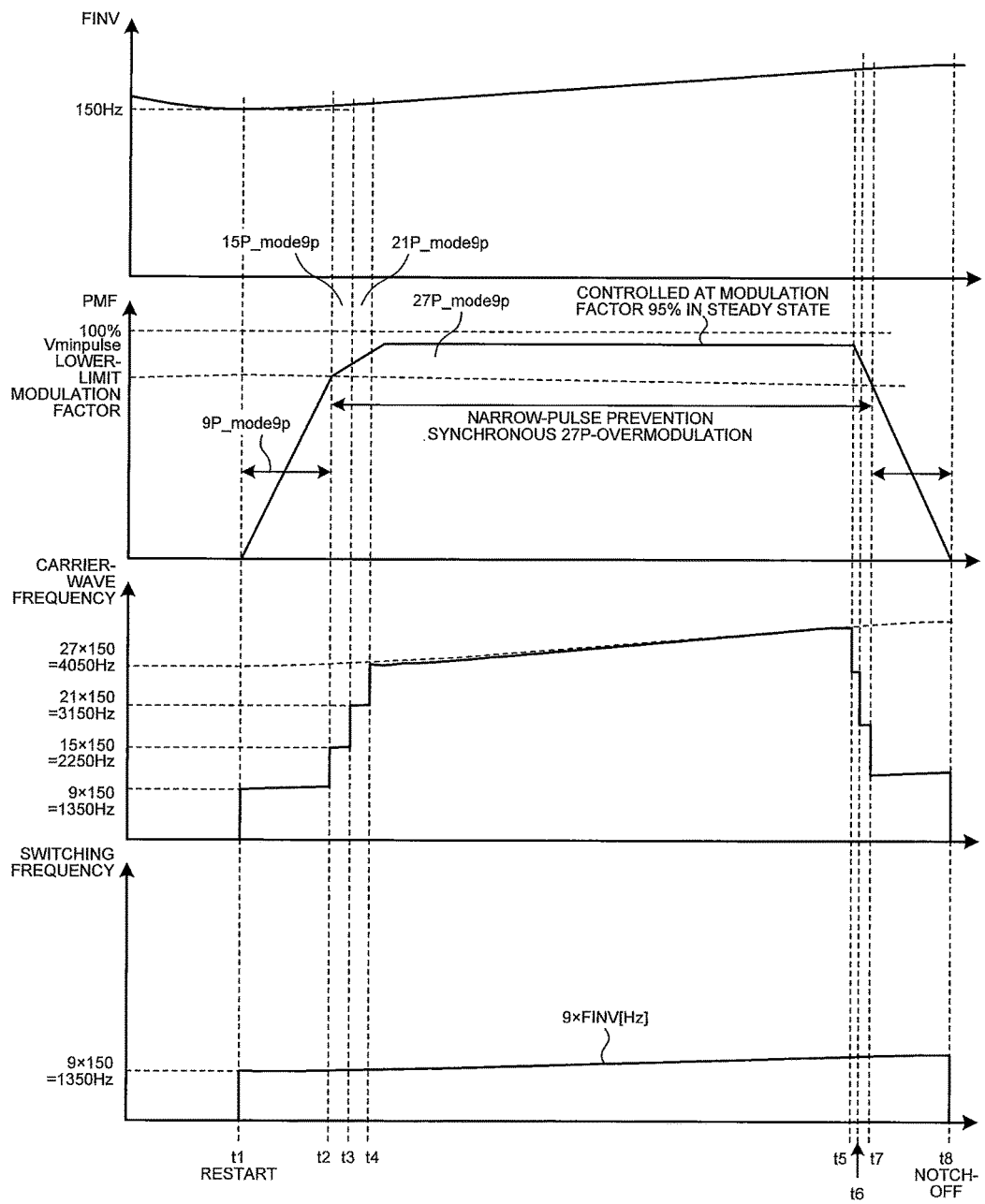
FIG. 21 is an explanatory diagram of an operation example of a power conversion device according to a fourth embodiment.

FIG. 21 is an explanatory diagram of an operation example of the power conversion device according to the fifth embodiment. In the same manner as FIG. 13 and FIG. 20, FIG. 21 illustrates an example of the operation waveform from the restart to notch-off in a power conversion device for a railway vehicle in the order described as "output-voltage frequency", "modulation factor", "carrier-wave frequency", and "switching frequency", from the top of the diagram. In the present embodiment, the carrier-wave frequency is different from the first and third embodiments in that a first carrier wave of 1350 (=9×150) [Hz], a second carrier wave of 2250 (=15×150) [Hz], a third carrier wave of 3150 (=21×150) [Hz], and a fourth carrier wave of 4050 (=27×150) [Hz], are prepared.

(Operation at the Time of Restart)

First, the power conversion device performs the restart at the time t1. The power conversion device performs the restart in the 9-wave non-overmodulation synchronous 9-pulse mode (9P_mode9p). At the time of restart, the first carrier wave with a carrier-wave frequency of 1350 [Hz] is selected as a carrier wave. At this time, the switching frequency is 1350 (=9×150) [Hz]. During the restart period, the carrier-wave frequency and the switching frequency increase gradually from 1350 (=9×150) [Hz]. Also, the output-voltage frequency (FINV) increases gradually from 150 [Hz], and the modulation factor PMF increases from 0 to the lower-limit modulation factor Vminpulse.

At the time t2, because the modulation factor PMF reaches the lower-limit modulation factor Vminpulse, the modulation mode is changed to the 15-wave overmodulation synchronous 9-pulse mode (15P_mode9p). At this time, the carrier wave is switched to the second carrier wave with a carrier-wave frequency of 2250 [Hz]. The switching frequency is 9×Finv [Hz].

Thereafter, at the time t3, the modulation mode is changed to the 21-wave overmodulation synchronous 9-pulse mode (21P_mode9p). At the time t4, the modulation mode is changed to the 27-wave overmodulation synchronous 9-pulse mode (27P_mode9p), and then the operation is brought to a steady state.

(Operation at the Time of Notch-Off)

At the time of notch-off, the power conversion device performs an operation in reverse order of the operation at the time of restart. First, at the time t5, while the modulation mode is changed from the 27-wave overmodulation synchronous 9-pulse mode (27P_mode9p) to the 21-wave overmodulation synchronous 9-pulse mode (21P_mode9p), the modulation factor PMF is decreased. At the time t6, the modulation mode is changed to the 15-wave overmodulation synchronous 9-pulse mode (15P_mode9p). Further, at the time t7, at which the modulation factor PMF reaches the lower-limit modulation factor Vminpulse, the modulation mode is changed to the 9-wave non-overmodulation synchronous 9-pulse mode (9P_mode9p). Thereafter, the modulation factor PMF is decreased. When the output voltage becomes zero, the notch-off operation is finished.

The power conversion device according to the fifth embodiment fixes the number of pulses in one cycle of the carrier wave to nine to perform the carrier-wave switching during the restart period or the notch-off period. Therefore, an effect is obtained where an unnecessary increase in the switching frequency can be suppressed, and ripples in the output voltage can be reduced. In the present embodiment, an example is illustrated, in which the number of pulses in one cycle of the carrier wave is fixed to nine. However, the number of pulses may be other than nine.

The power conversion device according to the fifth embodiment changes the modulation mode to a mode in which the number of pulses in one cycle of the carrier wave is fixed to a set value at the time of at least one of restart and notch-off. This can simplify the configuration of the modulation-wave generation unit. As a result, an effect is obtained where higher-speed processing can be achieved in the power conversion device.

Sixth Embodiment

In a sixth embodiment, there is described a vehicle drive system to which the power conversion device described in the first to fifth embodiments is applied.

FIG. 22 is a diagram illustrating a configuration example of the vehicle drive system according to the sixth embodiment in which the power conversion device is applied to a railway vehicle. The vehicle drive system according to the sixth embodiment includes an AC electric motor 101, a power conversion unit 102, an input circuit 103, and a control unit 108. The AC electric motor 101 corresponds to the AC load 1 illustrated in FIG. 1, and is installed in a railway vehicle. The power conversion unit 102 is the same as the power conversion unit 2 illustrated in FIG. 1, and includes switching elements 104a, 105a, 106a, 104b, 105b, and 106b. The power conversion unit 102 converts a DC voltage supplied from the input circuit 103 to an AC voltage having an arbitrary voltage and an arbitrary frequency to drive the AC electric motor 101. The control unit 108 corresponds to the power conversion device described in the first embodiment. That is, the control unit 108 is configured to include the switching-signal generation unit 4 and the modulation-factor calculation unit 8 that are described in the first embodiment. The control unit 108 generates switching signals SWu, SWv, and SWw for controlling the power conversion unit 102.

Although not illustrated in FIG. 22, an input circuit 103 is configured to include a switch, a filter capacitor, a filter reactor, and other constituent elements. One end of these elements is connected to an overhead wire 110 through a current collector 111. The other end is connected to a rail 114 that is the ground potential through wheels 113. The input circuit 103 receives a supply of DC power or AC power from the overhead wire 110, and generates DC power to be supplied to the power conversion unit 102.

In the manner as described above, the power conversion device according to the first to fifth embodiments is applied to the vehicle drive system. This makes it possible to achieve a reduction in the loss in the entire system, and downsize of the entire system.

Seventh Embodiment

In a seventh embodiment, there are described raw materials of the switching elements included in the power conversion unit. As a switching element used in the power conversion unit, a switching element, configured to connect a semiconductor transistor element (such as an IGBT or MOSFET) of a silicon (Si) material, and a semiconductor diode element of an Si material in inverse parallel, is generally used. The techniques described in the above first to fifth embodiments can be used in a power conversion unit that includes this general switching element.

Meanwhile, the techniques according to the above first to sixth embodiments are not limited to a switching element formed of an Si material. It is certainly possible to use a switching element of a silicon carbide (SiC) material, receiving attention in recent years, in the power conversion unit, in place of the Si material.

SiC has characteristics of being able to be used at a high temperature. Therefore, when a switching element of an SiC material is used as a switching element included in the power conversion unit, an allowable operation temperature of a switching element module can be increased to a higher temperature. Accordingly, it is possible to increase the carrier-wave frequency, and thus increase the switching speed. However, when the carrier-wave frequency is increased, there is an inductive-interference problem caused by generation of the narrow pulses as described above. Therefore, it is difficult to execute the control to simply increase the carrier-wave frequency without solving this problem.

As described above, according to the techniques in the first to sixth embodiments, even when the power conversion device that executes the PWM control increases the switching speed by using a switching element made of an SiC material, the power conversion device can still suppress generation of the narrow pulses. This makes it possible to improve the operational efficiency in the AC load, while suppressing the occurrence of inductive interference.

SiC is an example of a semiconductor referred to as "wide bandgap semiconductor" because of its wider bandgap properties than Si. In addition to SiC, a semiconductor formed of a gallium nitride-based material or diamond, for example, also belongs to the wide bandgap semiconductor. Their properties are similar to those of SiC in many respects. Therefore, a configuration using the wide bandgap semiconductor other than SiC also constitutes the scope of the present invention.

A transistor element and a diode element that are formed of the wide bandgap semiconductor as described above have a high voltage resistance and a high allowable current density. Therefore, it is possible to downsize the transistor element and the diode element. Accordingly, by using these downsized transistor element and diode element, it is possible to downsize a semiconductor module having these elements incorporated therein.

Further, the transistor element and diode element formed of the wide bandgap semiconductor have a high heat resistance. Therefore, it is possible to downsize a heat sink, and accordingly it is possible to further downsize the switching element module.

Furthermore, the transistor element and diode element formed of the wide bandgap semiconductor have low power loss. Therefore, it is possible to achieve high efficiency of the switching element and the diode element, and accordingly it is possible to achieve high efficiency of the switching element module.

Configurations described in the first to seventh embodiments described above are only examples of the contents of the present invention, and these configurations can be combined with other publicly known techniques, and a part of the configurations can be omitted or modified without departing from the scope of the present invention.

REFERENCE SIGNS LIST

1 AC load
2 power conversion unit
3 DC power supply
4 switching-signal generation unit
5 carrier-wave generation unit
6 modulation-wave generation unit
7 comparison unit
8 modulation-factor calculation unit
10 voltage detection unit
51, 52 carrier-wave table
53 carrier-wave selection unit
61, 61A mode selection unit
62, 62A correction-coefficient table group
63, 63A correction-coefficient selection unit
64, 64A phase-condition table group
65, 65A specific-phase selection unit
66 three-phase generation unit
67 multiplier
68 modulation-factor selection unit
69, 69A modulation-wave calculation unit
101 AC electric motor
102 power conversion unit
104a, 105a, 106a, 104b, 105b, 106b switching element
106 input circuit
108 control unit
110 overhead wire
111 current collector
113 wheel
114 rail
611, 612, 613, 682 comparison determination device
615, 616 adder
631 modulation-factor correction-coefficient storage unit
651 specific-phase storage unit
681 phase conversion unit
683 modulation-wave amplitude switching unit

The invention claimed is:

1. A power conversion device comprising:
a power conversion unit including a switching element that performs a switching operation based on a switching signal;
a modulation-wave generation unit to generate a modulation wave;
a carrier-wave generation unit to generate a first carrier wave with a frequency higher than the modulation wave, and a second carrier wave with a frequency higher than the first carrier wave, and to select and output either the first carrier wave or the second carrier wave according to a modulation factor of the power conversion unit; and
a switching-signal generation unit to generate the switching signal by comparing either the first carrier wave or the second carrier wave to the modulation wave, wherein
the carrier-wave generation unit outputs the first carrier wave when the modulation factor is lower than a threshold value, and outputs the second carrier wave when the modulation factor is equal to or higher than the threshold value, to switch between the first carrier wave and the second carrier wave based on the modulation factor, and
when the modulation factor is equal to or higher than the threshold value, the power conversion unit operates in an overmodulation mode, in which the switching operation is stopped during a period longer than one cycle of the second carrier wave.

2. The power conversion device according to claim 1, wherein the carrier-wave generation unit switches between the first carrier wave and the second carrier wave in a restart period when the power conversion device performs restart in a frequency range higher than a frequency that corresponds to the threshold value of the modulation factor.

3. The power conversion device according to claim 1, wherein the carrier-wave generation unit switches between the first carrier wave and the second carrier wave in a notch-off period when the power conversion device performs notch-off in a frequency range higher than a frequency that corresponds to the threshold value of the modulation factor.

4. The power conversion device according to claim 1, wherein the first carrier wave is synchronized with the modulation wave, and the second carrier wave is asynchronous to the modulation wave.

5. The power conversion device according to claim 1, wherein the first carrier wave and the second carrier wave are both synchronized with the modulation wave.

6. The power conversion device according to claim 1, wherein the modulation-wave generation unit generates a modulation wave whose fundamental wave corresponds to one cycle of an output-voltage command.

7. The power conversion device according to claim 6, wherein the threshold value has a value of less than $\pi/4$.

8. The power conversion device according to claim 1, wherein the modulation-wave generation unit generates a modulation wave that includes one cycle of an output-voltage command as a fundamental wave, where a 3n-th-order (n is a positive integer) harmonic of the fundamental wave is superimposed on the modulation wave.

9. The power conversion device according to claim 8, wherein the threshold value has a value of less than $\pi/\sqrt{12}$.

10. The power conversion device according to claim 1, wherein when a modulation factor of an output-voltage command is lower than the threshold value, the second carrier wave is output asynchronously, and when the modulation factor is maintained in a state of being lower than the threshold value, and when a frequency of the output-voltage command is equal to or higher than a threshold value, the second carrier wave is output in synchronization with the output-voltage command.

11. The power conversion device according to claim 1, wherein when a modulation factor of an output-voltage command is lower than the threshold value, the second carrier wave is output asynchronously, and although the modulation factor becomes equal to or higher than the threshold value, when a frequency of the output-voltage command is lower than a threshold value, the first carrier wave is output asynchronously.

12. The power conversion device according to claim 1, wherein at a time of at least one of restart and notch off, the power conversion device changes a mode to a mode in which number of pulses in one cycle of a carrier wave is fixed to a set value.

13. The power conversion device according to claim 1, wherein the switching element included in the power conversion unit is formed of a wide bandgap semiconductor.

14. The power conversion device according to claim 13, wherein the wide bandgap semiconductor is a semiconductor using silicon carbide, a gallium nitride-based material, or diamond.

15. The power conversion device according to claim 1, wherein
- in the overmodulation mode, a length of a specific-phase section, during which a switching operation of the power conversion unit is stopped, is increased irregularly as the modulation factor increases,
- the carrier-wave generation unit generates a third carrier wave with a frequency higher than the second carrier wave, and
- when a length of the specific-phase section is increased irregularly in the overmodulation mode, the carrier-wave generation unit switches from the second carrier wave to the third carrier wave, and outputs the third carrier wave, so as to irregularly increase a carrier-wave frequency as a length of the specific-phase section is increased irregularly.

16. A vehicle drive system comprising:
the power conversion device according to claim 1;
an input circuit to generate power to be input to the power conversion device; and
an electric motor to be driven by the power conversion device.

* * * * *